US012611894B2

(12) United States Patent
Nicol et al.

(10) Patent No.: US 12,611,894 B2
(45) Date of Patent: Apr. 28, 2026

(54) AUTOMATIC TIRE INFLATION SYSTEM

(71) Applicant: Rivian IP Holdings, LLC, Irvine, CA (US)

(72) Inventors: Steven Digby Nicol, San Clemente, CA (US); Timothy P. Hopkins, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 411 days.

(21) Appl. No.: 18/216,061

(22) Filed: Jun. 29, 2023

(65) Prior Publication Data

US 2025/0001816 A1      Jan. 2, 2025

(51) Int. Cl.
B60C 23/00 (2006.01)

(52) U.S. Cl.
CPC .. B60C 23/00345 (2020.05); B60C 23/00354 (2020.05)

(58) Field of Classification Search
CPC ........... B60C 23/00345; B60C 23/003; B60C 23/00363; B60C 23/00372; B60C 23/00381; B60C 23/0039
See application file for complete search history.

(56) References Cited

U.S. PATENT DOCUMENTS

| | | | | |
|---|---|---|---|---|
| 2,976,906 A | * | 3/1961 | Kamm | B60C 23/00354 152/417 |
| 5,174,839 A | * | 12/1992 | Schultz | B60C 23/00318 384/489 |

| | | | | |
|---|---|---|---|---|
| 5,253,688 A | * | 10/1993 | Tigges | B60C 23/00336 301/128 |
| 6,575,269 B1 | * | 6/2003 | Skoff | F16J 15/162 152/416 |
| 6,719,028 B2 | * | 4/2004 | D'Amico | B60C 23/00318 180/385 |
| 10,059,155 B2 | * | 8/2018 | Hoeldrich | B60C 23/00363 |
| 11,130,375 B2 | * | 9/2021 | Buhrke | B60C 23/00363 |
| 11,292,300 B2 | * | 4/2022 | Balistreri | B60C 23/00381 |
| 2014/0062031 A1 | * | 3/2014 | Honzek | F16J 15/3228 277/551 |

FOREIGN PATENT DOCUMENTS

JP          2008222099 A   *   9/2008   ....... B60C 23/00318

OTHER PUBLICATIONS

Obringer, Lee Ann, "How Self-inflating Tires Work", HowStuffWorks. com, https://auto.howstuffworks.com/self-inflating-tire.htm, Feb. 9, 2021.

* cited by examiner

*Primary Examiner* — Jason R Bellinger
(74) *Attorney, Agent, or Firm* — HG LAW LLP

(57)          ABSTRACT

A system includes a valve coupled to a source of compressed air and a wheel hub. The wheel hub includes a stationary element associated with a wheel of a vehicle, a rotary element configured to rotate with the wheel, a seal therebetween, and a port arranged in the rotary element, wherein a flow path extends from the source to valve, the valve to the seal, the seal to the port, and the port to the wheel. A method includes measuring a pressure of a tire based on a sensor signal, where the tire is mounted to a wheel coupled to a wheel hub of a vehicle, determining whether to inflate or deflate the tire based on the pressure, generating a control signal to control the valve coupled to the tire to achieve an open position, and monitoring the pressure of the tire while the valve is in the open position.

20 Claims, 14 Drawing Sheets

1700

AUTOMATIC TIRE INFLATION SYSTEM

INTRODUCTION

The present disclosure is directed to an automatic tire inflation system, and more particularly to a system configured to provide controllable inflation via a wheel hub.

SUMMARY

A vehicle may include wheels having tires, which may be pressurized by air. Depending on driving conditions, user preferences, or state of the tires, inflation or deflation may be applied to the tires to increase or decrease tire pressure. In some embodiments, the present disclosure is directed to an integrated and relatively hidden air system for managing tire pressure.

In some embodiments, the present disclosure is directed to a system including a valve coupled to a source of compressed air and a wheel hub. In some embodiments, a vehicle may include more than one wheel hub (e.g., two or four wheel hubs corresponding to respective wheels). The wheel hub includes a stationary element associated with a wheel of a vehicle, a rotary element configured to rotate with the wheel, and a seal between the stationary element and the rotary element. The wheel hub further includes a port arranged in the rotary element, wherein a flow path extends from the source to valve, the valve to the seal, the seal to the port, and the port to the wheel. In some embodiments, the stationary element is coupled to the rotary element by at least one bearing.

In some embodiments, the port is a first port configured to receive the compressed air, the system further comprising a second port configured to direct the compressed air to the wheel when mounted to the wheel hub. In some embodiments, the valve is coupled to a plenum, the source of compressed air is an air compressor, and the valve is controllable to be open or closed. In some embodiments, the valve includes a controllable valve arranged in series with a second valve and with a wheel coupled to the wheel hub. In some embodiments, the second valve includes a check valve arranged in series with the controllable valve and with the wheel. In some embodiments, the controllable valve is a first controllable valve, the second valve includes a second controllable valve arranged in series with the first controllable valve and with the wheel, and the second controllable valve is mounted to the wheel hub. In some embodiments, the system includes a pressure sensor configured to sense a pressure of at least one of the compressed air or a tire of the wheel coupled to the wheel hub.

In some embodiments, the present disclosure is directed to an apparatus that includes a stationary element associated with a wheel comprising a tire, a rotary element configured to rotate with the wheel relative to the stationary element, a seal arranged radially between the stationary element and the rotary element and configured to seal a volume between the stationary element and the rotary element, and a port configured to direct air from the volume to the tire. In some embodiments, the stationary element is coupled to the rotary element by at least one bearing, and the seal is arranged between the stationary element and the rotary element along a drive axis. In some embodiments, a flow path of the air is directed from an air source to a recess of the stationary element, from the recess to the volume, and from the volume to the port. In some embodiments, the seal includes at least two lips configured to seal against the rotary element when the volume is pressurized. In some embodiments, the port is a first port configured to rotate with the wheel, and the stationary component includes a second port coupled to an air source. For example, a flow path extends from the second port through the stationary component to the volume, and from the volume to the first port, and from the first port to a conduit fluidly coupled to the tire.

In some embodiments, the present disclosure is directed to a method that includes measuring a pressure of a tire based on a sensor signal, wherein the tire is mounted to a wheel coupled to a wheel hub of a vehicle, determining whether to inflate or deflate the tire based on the pressure, generating a control signal to control a valve coupled to the tire to achieve an open position to form a flow path through the wheel hub, and monitoring the pressure of the tire while the valve is in the open position. In some embodiments, the method includes receiving an indication from an interface. For example, the indication includes at least one of a tire pressure, a driving condition, or a user preference, or a combination thereof and determining whether to inflate or deflate the tire is further based on the indication. In some embodiments, the method includes receiving an indication from an interface, and the indication includes at least one of a target pressure or a target pressure range. In some embodiments, the method includes generating a first control signal that causes an air compressor to begin compressing air, and generating a second control signal that causes the air compressor to cease compressing air when the pressure is greater than a threshold. In some embodiments, the valve is one of a plurality of valves coupled to an air source, each valve is coupled to a respective wheel, and generating the control signal includes generating a plurality of control signals corresponding to the plurality of valves. In some embodiments, measuring the pressure of the tire includes opening a valve to communicate the pressure to a sensor, and closing the valve to seal the tire after the sensor signal is received by the control circuitry. For example, the pressure sensor may be located remote from the wheel. In some embodiments, the valve is a first valve affixed to a plenum, the control signal is further configured to open a second valve affixed to the wheel hub, and the second valve is arranged in series with the first valve.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

A vehicle includes wheels having tires, which may have corresponding inflation pressure ratings and recommended settings. In some circumstances, vehicles may be driven with under-inflated or over-inflated tires, which may be inefficient in terms of range and tire wear. Further, in some circumstances, it may be desired for tires to be at least partially deflated for off-road driving, which may require re-inflation by addressing the tires one-by-one with a compressor. In some embodiments, the present disclosure is directed to methods and systems for utilizing an on-board air compressor and sensor system to monitor and inflate tires as required, recommended, or otherwise determined. In some embodiments, for example, the air is routed from an air compressor to the wheel hub bearing, which may be designed to include an air path through to the inner side of the wheel.

Figure 1:
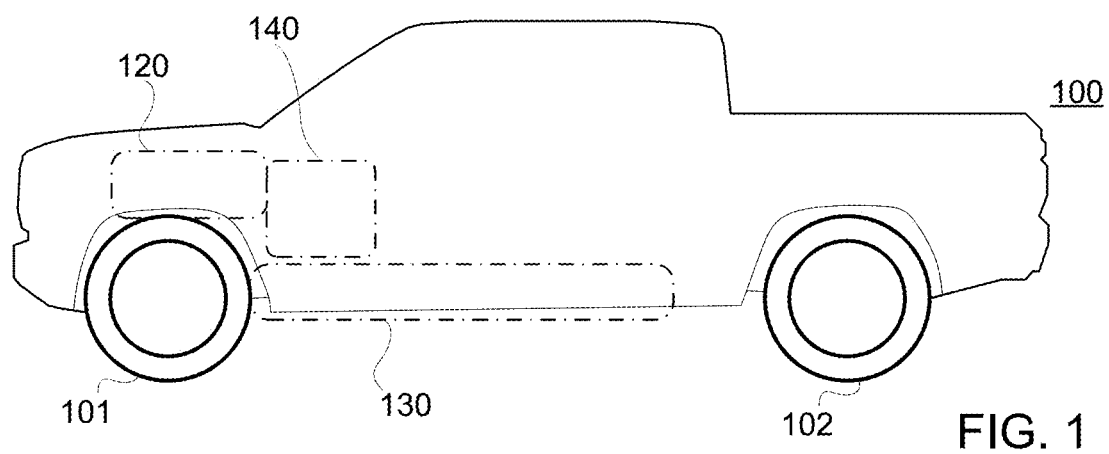
FIG. 1 shows a block diagram of an illustrative vehicle having a tire inflation system, in accordance with some embodiments of the present disclosure.

FIG. 1 shows a block diagram of illustrative vehicle 100 having a tire inflation system (e.g., system 140), in accordance with some embodiments of the present disclosure. As illustrated, vehicle 100 includes control system 120, battery system 130, and system 140 for inflating tires 101 and 102 (e.g., and also tires on the non-visible side of vehicle 100 in FIG. 1), in accordance with some embodiments of the present disclosure. Control system 120 includes control circuitry that is coupled to sensors, actuators, interfaces, and any other suitable components to control one or more systems such as system 140. Control system 120 may include control circuitry for monitoring sensor signals, generating control signals, executing computer readable instructions, receiving inputs, or a combination thereof. In some embodiments, system 140 includes a pneumatic system such as, for example, a compressor-based or pump-based system for providing pressurized air. Battery system 130 (e.g., also referred to as an energy storage system or ESS) may include a plurality of battery cells, enclosures and power electronics (e.g., a DC-DC converter, switches). Vehicle 100 may include drive units that may include motors, gearing, bearings, hubs, shafts, gearbox housings, any other suitable components, or any combination thereof. For example, each drive unit may include an inverter, electric motor, and a gearbox for providing torque to a respective wheel or drive axis of the electric vehicle via a half-shaft and constant-velocity (CV) joint.

Figure 2:
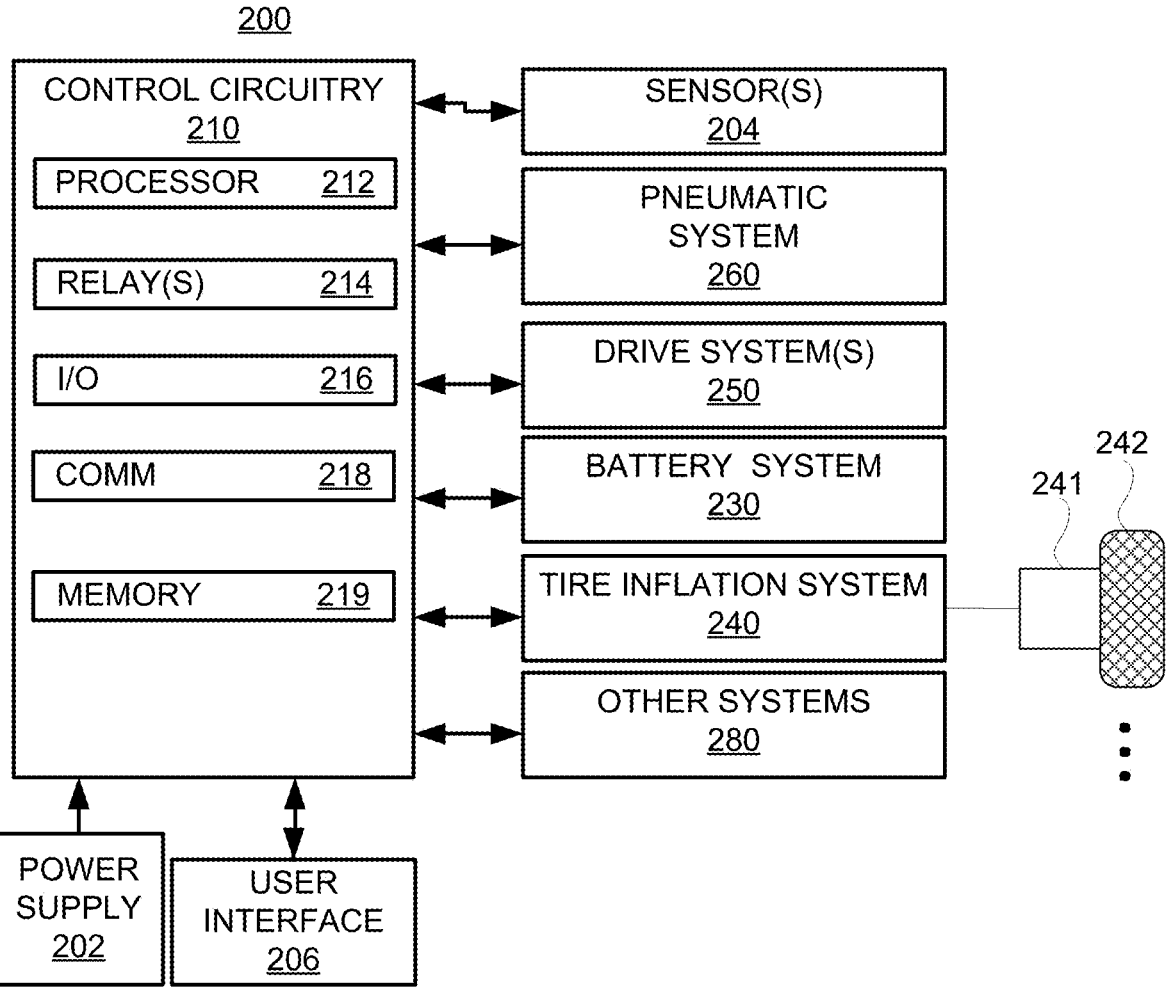
FIG. 2 shows a block diagram of an illustrative system for managing tire inflation, in accordance with some embodiments of the present disclosure.

FIG. 2 shows a block diagram of illustrative system 200 for managing tire inflation, in accordance with some embodiments of the present disclosure. For example, system 200 may be included as part of vehicle 100 of FIG. 1, where control circuitry 210 may correspond to control system 120, battery system 230 corresponds to battery system 130, and tire inflation system 240 (e.g., and/or pneumatic system 260) may correspond to system 140.

In an illustrative example, a vehicle controller may monitor and control tire inflation system 240, and determine when and if inflation is needed (e.g., based on ambient conditions, driving conditions, sensor signals, reference information, preference information, and/or user input). A control system, as illustrated in FIG. 2, may be configured to manage inflating, deflating, or a combination thereof for any or all tires of a vehicle (e.g., vehicle 100). In an illustrative example, drivetrain components 250 may include a plurality of drive units, a plurality of electric motors (e.g., four electric motors, corresponding to a respective wheel of a vehicle), or otherwise one or more systems for generating torque at wheels of the vehicle. Tire inflation system 240, as illustrated, may include one or more compressors, air filters, ducting, manifolds, air tanks or vessels, and controls for managing tire pressure and/or air flow to and from tires.

Although illustrated as separate, tire inflation system 240 and pneumatic system 260 may overlap, be interfaced to each other via one or more components (e.g., valves, fittings, conduits, tanks), or otherwise be modified from system 200 as illustrated. Further, the boundary delineating each system is merely illustrative. Accordingly, system delineations illustrated herein are merely exemplary for purposes of discussion.

Illustrative control circuitry 210 includes processor 212, one or more relays 214 (hereinafter referred to as relay(s) 214), input/output 216 (hereinafter referred to as I/O 216), communication hardware 218 (hereinafter referred to as COMM 218), and memory 219. Control circuitry 210 may include hardware, software, or both, implemented on one or more modules configured to provide control of a tire inflation system. In some embodiments, processor 212 includes one or more microprocessors, microcontrollers, digital signal processors, programmable logic devices, field-programmable gate arrays (FPGAs), application-specific integrated circuits (ASICs), or any suitable combination thereof. In some embodiments, processor 212 is distributed across more than one processor or processing units. In some embodiments, control circuitry 210 executes instructions stored in memory (e.g., non-transitory computer readable media) for managing tire pressure and inflation. In some embodiments, memory 219 is an electronic storage device that is part of control circuitry 210. For example, memory may be configured to store electronic data, computer instructions, applications, firmware, or any other suitable information. In some embodiments, memory 219 includes random-access memory, read-only memory, hard drives, optical drives, solid state devices, or any other suitable memory storage devices, or any combination thereof. For example, memory may be used to launch a start-up routine, diagnostic routine, or tire-management routine. In some embodiments, memory 219 includes non-transitory computer-readable media that includes computer executable instructions for controlling tire pressure (e.g., processes 800-1100 of FIGS. 8-11).

In some embodiments, control circuitry 210 is powered by power supply 202. In some embodiments, power supply 202 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 202 may be same as or otherwise included as part of battery system 230.

In some embodiments, user interface 206 includes a push button, a toggle switch, a turnable knob, a display screen (e.g., a touch screen), a key fob, a key-lock combination, any other suitable system or component for receiving input from a user or providing output to a user, or any combination thereof. In some embodiments, user interface 206 includes a touchscreen on the dash of a vehicle, configured to receive input from the user, and provide a display to the user. In some embodiments, user interface 206 includes one or more buttons that are selectable by a user. For example, the one or more buttons may include a button coupled to a switch, a button on a touchpad, any other suitable button that may be used by a user to make a selection, or any combination thereof. In some embodiments, user interface 206 includes one or more turnable knobs that a user may turn to adjust a drive mode, driving conditions, target tire pressure or range, or another suitable setting.

In some embodiments, sensor(s) 204 include one or more pressure sensors (e.g., piezo or strain-based transducers mounted to a non-rotating component, tire pressure monitoring system sensors mounted to a wheel), speed sensors (e.g., a rotary encoder), position sensors (e.g., a rotary encoder), current sensors (e.g., of a compressor motor), flow sensors, any other suitable sensors, or any combination thereof. For example, sensor(s) 204 may be used to measure pressure or a difference in pressure of a fluid (e.g., air or any other suitable gas). In a further example, sensor(s) 204 may be used to measure a flow rate of air. Sensor(s) 204 is also referred to herein as sensors 204, and accordingly may include one or more sensors of any suitable type or types.

Drive system(s) 250 may include one or more front drive units, rear drive units, or both, which may each include a motor coupled via a gearset to an output shaft that corresponds to a wheel or a drive axis of the vehicle. To illustrate, each drive unit may include a motor coupled to a gearbox having a lubricating oil system and cooling passages (e.g., for interfacing to coolant system 230), wherein the motor is electrically coupled to an inverter or otherwise power electronics (e.g., a motor drive).

Tire inflation system 240 may be the same as or similar to, or included as part of, system 140 of FIG. 1, or pneumatic system 260 of FIG. 2. In some embodiments, tire inflation system 240 is coupled to wheel 242 by hub assembly 241 (e.g., also referred to as a wheel hub), and additionally to any suitable number of wheels (e.g., four wheels for a four-wheel vehicle). Tire inflation system 240 may include a compressor, filter, one or more sensors (e.g., pressure sensors, temperature sensors, current sensors, shaft speed sensors), valves (e.g., controllable valves, check valves, pressure-relief valves), pressure regulators, conduits, fittings, manifolds, components designed to direct and meter air flow to wheels such as wheel 242 (e.g., via one or more suitable hubs), any other suitable components, or any combination thereof. In some embodiments, tire inflation system 240 may be coupled to pneumatic system 260 (e.g., which may be a pressurized air supply), and need not include a separate compressor. In some embodiments, tire inflation system 240 includes control circuitry such as a controller, module, FPGA, or any other suitable circuitry to provide monitoring, control, communication, or a combination thereof.

Other systems 280 may include suspension systems, controllers or modules (e.g., having processors), electronics, display devices, or other suitable systems that may interface to tire inflation system 240 or pneumatic system 260.

Illustrative system 200 of FIG. 2, or aspects thereof, may be used to control any suitable system disclosed herein and implement any suitable method disclosed herein, in accordance with the present disclosure. In some embodiments, not all components shown in FIG. 2 need be included in system 200. In some embodiments, control circuitry 210 is configured to determine an operation mode such as off-road, wet-road, highway, city street, eco, or any other suitable mode (e.g., which defines how the system operates). For example, control circuitry 210 may execute computer readable instructions stored on non-transitory computer readable media to select from among operating modes (e.g., based on input from user interface 206), retrieve reference information (e.g., from memory), generate and transmit control signals to any system of system 200, receive and process sensor signals, or a combination thereof. System 200, or control circuitry 210 thereof, may be referred to herein as a control system (e.g., for controlling pressure of one or more tires). It will be understood that a mode, as referred to herein, corresponds to any suitable form of operation for providing air to a tire, controlling a pressure of a tire, or a combination thereof.

FIGS. 3-7 illustrate some examples of tire inflation systems, in accordance with the present disclosure. It will be understood that any or all of the illustrative systems of FIGS. 3-7 may be combined, have components omitted or added, or otherwise be modified, in accordance with the present disclosure.

Figure 3:
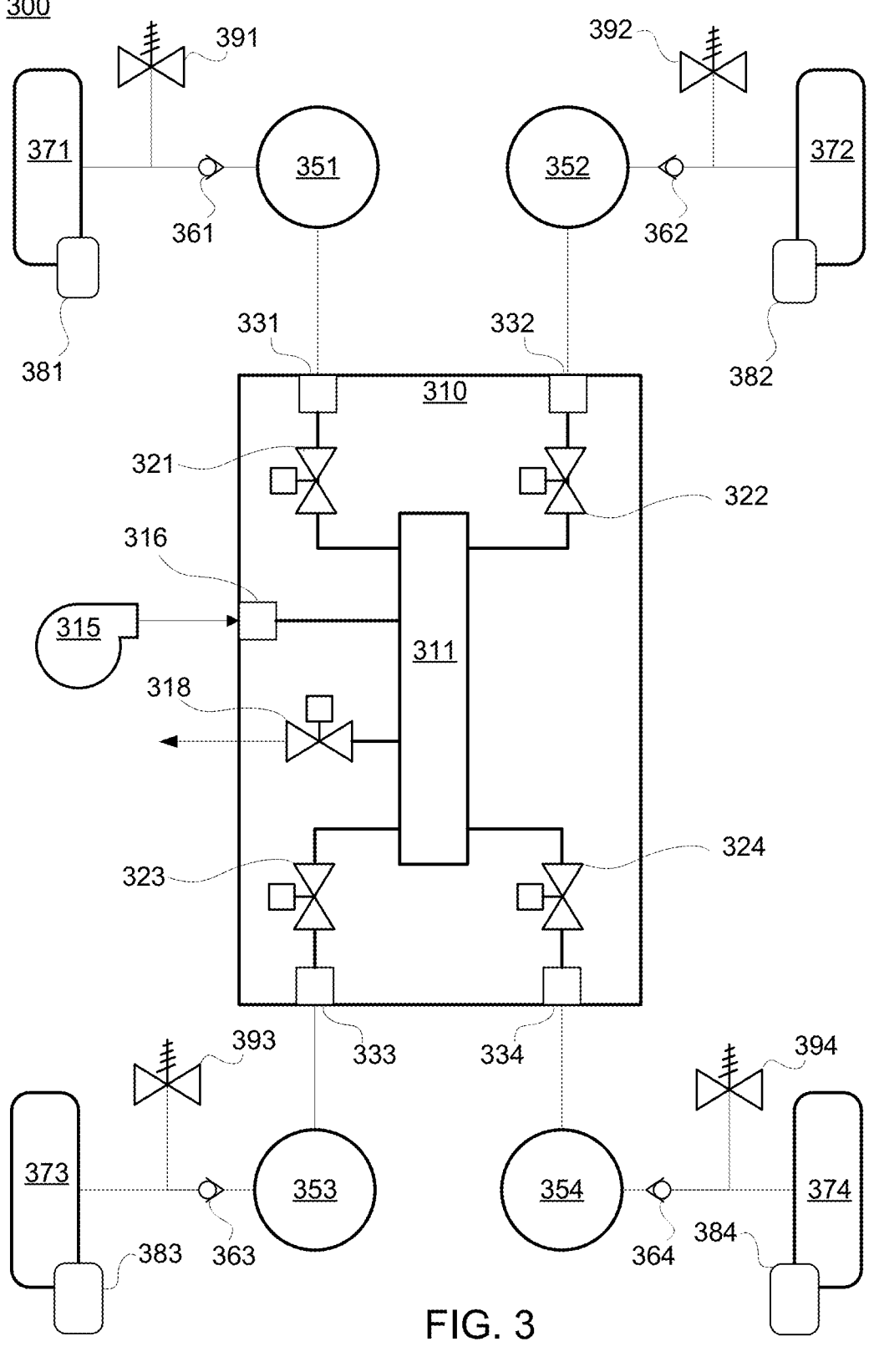
FIG. 3 shows a block diagram of an illustrative tire inflation system, having one or more relief valves, in accordance with some embodiments of the present disclosure.

FIG. 3 shows a block diagram of an illustrative tire inflation system (e.g., system 300), having one or more relief valves, in accordance with some embodiments of the present disclosure. To illustrate, system 300 may be same as or similar to components of tire inflation system 240 of FIG. 2 (e.g., along with hub 241 and wheel 242), system 140 of vehicle 100 of FIG. 1, or both.

As illustrated, system 300 includes compressor 315, ports 316 and 331-334, block 311 (e.g., a valve block, plenum, or manifold), valves 318 and 321-324 (e.g., electronically controllable valves, solenoid valves), hubs 351-354 (e.g., also referred to as "wheel hubs"), check valves 361-364, pressure relief valves (PRVs) 391-394, wheels 371-374 (e.g., each having a respective tire), and sensors 381-384. Further, as illustrated, assembly 310 includes valves 318 and 321-324, ports 316 and 331-334, and block 311. During operation, compressor 315 may be controlled (e.g., using control circuitry 210), based on speed, output pressure, or any other suitable parameter, to provide pressurized air to assembly 310 via port 316. The pressurized air may fill block 311 (e.g., a distribution block or manifold), with valve 318 closed. Valve 318 may be an exhaust valve used to vent block 311, and may be closed during pressurization. Each of valves 321, 322, 323, and 324 may be controlled (e.g., by control circuitry 210) to an open position, closed position, or adjustable position (e.g., to control pressure drop or flow). As one or more of valves 321-324 are opened, the pressurized air in block 311 may flow through ports 331-334 to respective hubs 351-354, check valves 361-364, and tires of wheels 371-374. Block 311 may include a block having ports, a plenum or otherwise a manifold system that distributes air. In some embodiments, PRVs 391-394, which may be spring-loaded or any other suitable type of valve having a cracking pressure, may be set to a predetermined pressure that may correspond to a maximum operating temperature of tires of wheels 371-374. For example, the maximum operating pressure may be prescribed by the manufacturer, inputted by a user or distributor, or otherwise determined based on one or more criteria (e.g., weather, road conditions, loaded weight, ambient temperature).

In a further example, system 300 may be used to pressurize tires of wheels 371-374 individually, by controlling which of valves 321-324 are opened or closed, or otherwise how much each of valves 321-324 are opened (e.g., if the open area is controllable). For example, each of valves 321-324 may be communicatively coupled to control circuitry 210, which may generate and transmit respective control signals to control each of valves 321-324. In some embodiments, each port of ports 331-334 (e.g., first, second, third, and fourth ports) is configured to receive compressed air from compressor 315. For example, each port of ports 331-334 may be configured to direct the compressed air to a respective wheel of wheels 371-374, which are each mounted to a respective wheel hub of hubs 351-354.

In a further example, system 300 may be used to monitor and control tire pressure. In some embodiments, each of sensors 381-384 may generate and transmit a respective sensor signal that may be received at control circuitry 210 (e.g., or tire inflation system 240), and accordingly the sensor signals may be analyzed to determine whether the pressure is within a target operating range or outside of the target operating range. If the measured pressure of any tire of wheels 371-374 is low, system 300 may direct pressurized air from compressor 315 through the respective valve of valves 321-324 to that tire (e.g., if the tire of wheel 371 is low, valve 321 may be opened to inflate the tire). In a further example, valve 318 may be opened to depressurize block 311 and optionally hubs 351-354 (e.g., the pneumatic circuit up to check valves 361-364) when tires of wheels 371-374 are not being inflated. To illustrate, sensors 381-384 may include tire pressure monitoring sensors (TPMSs) that are configured to sense tire pressure and transmit a sensor signal to a receiver (e.g., of control circuitry 210). Sensors 381-384 may be wireless, and may be installed as part of the valve stem of the tires, for example.

Figure 4:
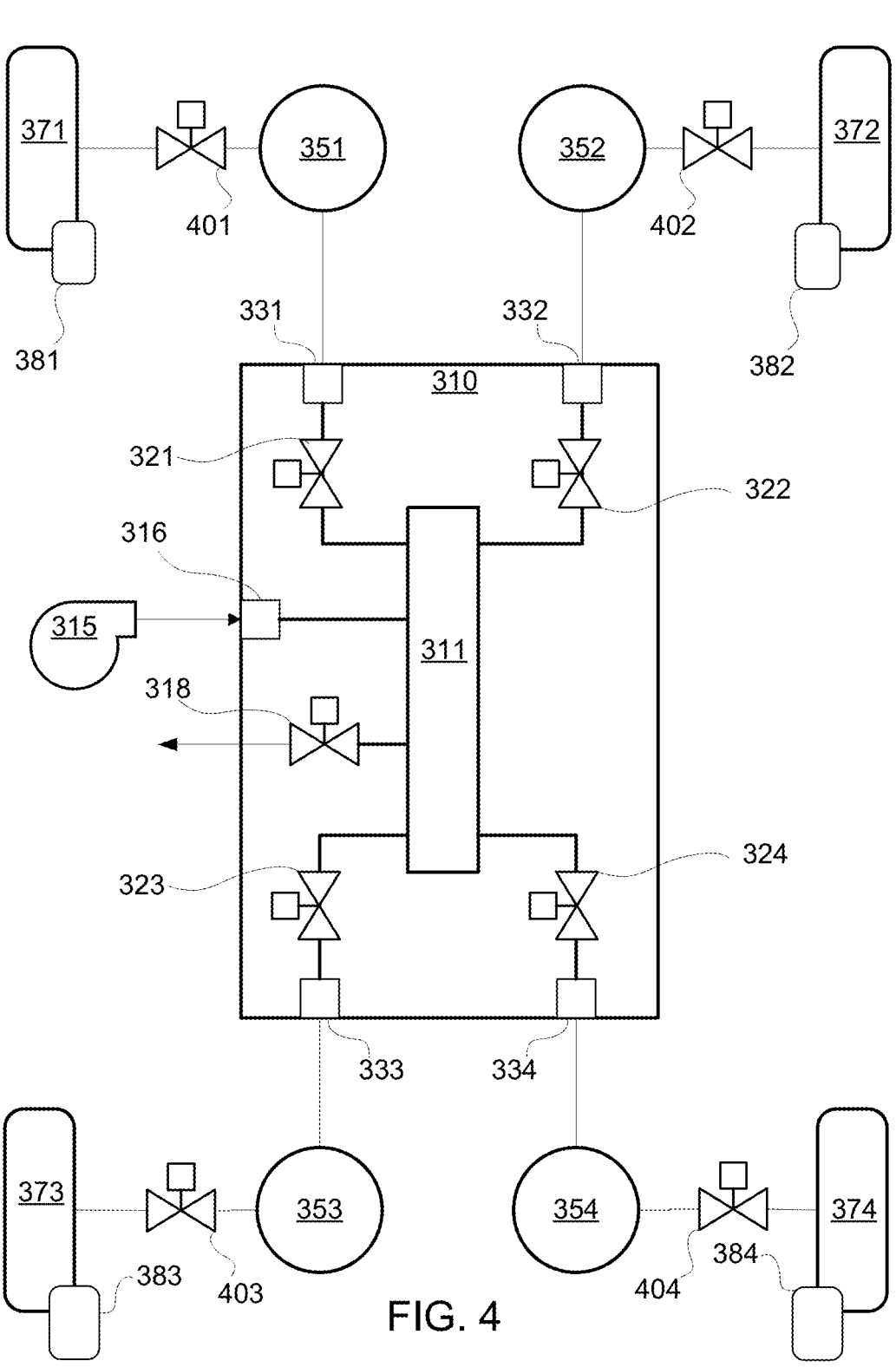
FIG. 4 shows a block diagram of another illustrative tire inflation system, in accordance with some embodiments of the present disclosure.

FIG. 4 shows a block diagram of illustrative tire inflation system 400, in accordance with some embodiments of the present disclosure. To illustrate, system 400 may be same as or similar to tire inflation system 240 or FIG. 2, system 140 of vehicle 100 of FIG. 1, or both. To illustrate further, system 400 may correspond to system 300, wherein check valves 361-364 and pressure relief valves 391-394 are replaced with valves 401-404 (e.g., electronically controllable valves, solenoid valves). In a further example, systems 300 and 400 may be combined in any suitable manner, and may include any or all of a check valve, PRV, and controllable valve at the respective hub-wheel interface. In some embodiments, for example, I/O 216 of FIG. 2 may include an interface to control any or all of valves 318, 321-324, and 401-404. The interface may include terminals for providing signals to each valve (e.g., digital on/off, relays 214, switch system, or other suitable interface). In some embodiments, each valve (e.g., a first valve) of valves 321-324 is or includes a controllable valve arranged in series with a valve (e.g., a second valve) of valves 401-404 and with a respective wheel of wheels 371-374 coupled to a respective wheel hub of hubs 351-354. In some embodiments, each valve (e.g., the second valve) of valves 401-404 is mounted to a respective wheel hub of hubs 351-354.

As illustrated, system 400 includes compressor 315, ports 316 and 331-334, block 311 (e.g., a valve block), valves 318 and 321-324 (e.g., electronically controllable valves, solenoid valves), hubs 351-354, valves 401-404, wheels 371-374 (e.g., each having a respective tire), and sensors 381-384. Further, as illustrated, all of valves 318, 321-324, and 401-404 may be controllable using control circuitry 210 of FIG. 2. In some embodiments, system 400 may be used to inflate or deflate tires of wheels 371-374 based on a target operating range. For example, for off-roading or high-temperature conditions when pressure may be too high, each respective valve of valves 321-324 and 401-404 may be opened along with valve 318 to vent one or more tires to a desired value (e.g., without compressor 315 providing pressurized air such that block 311 is not appreciably pressurized). For example, if valves 401, 321, and 318 are opened, the tire of wheel 371 will deflate as air flows to out to atmosphere.

Figure 5:
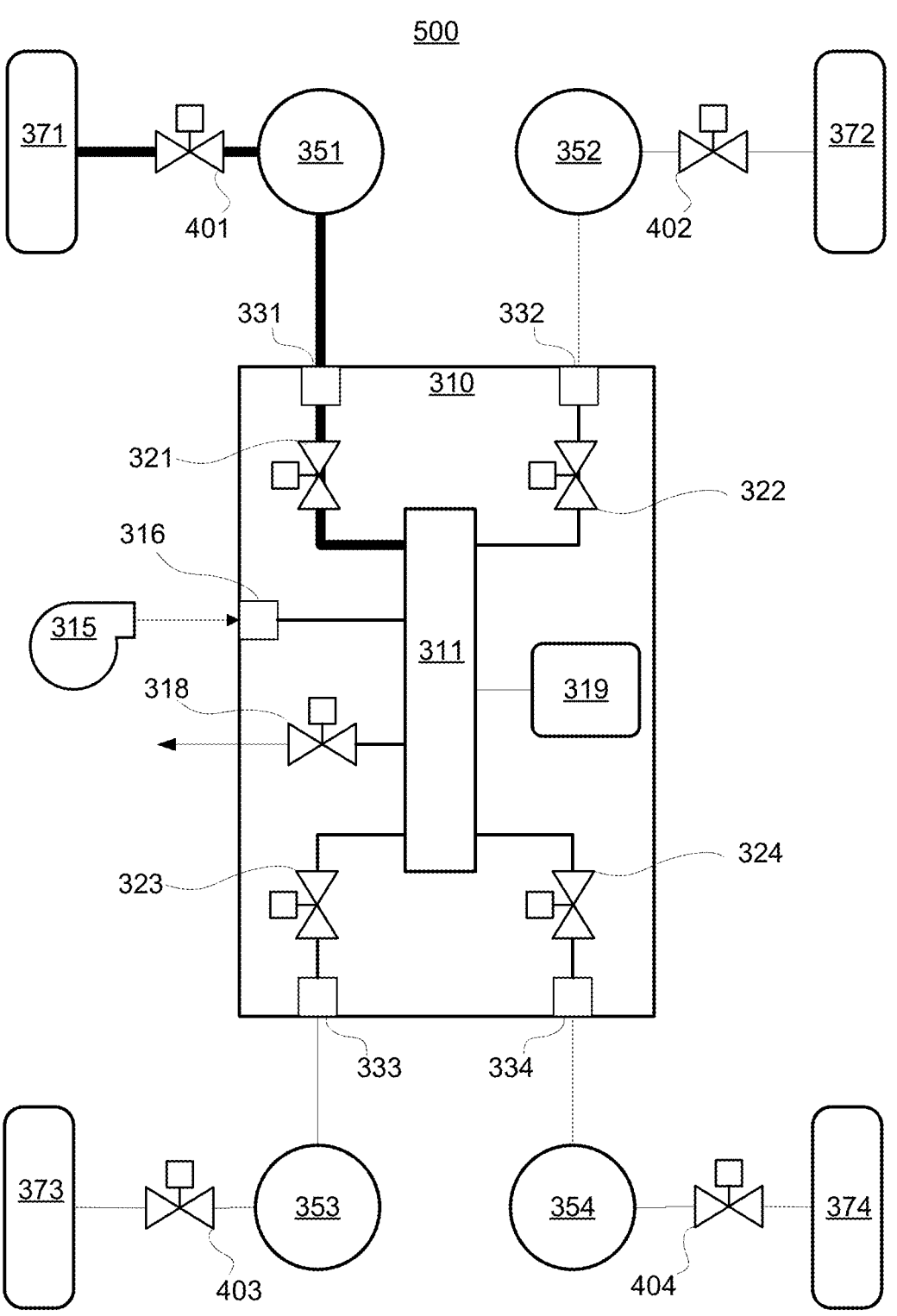
FIG. 5 shows a block diagram of another illustrative tire inflation system, having a valve block pressure sensor, in accordance with some embodiments of the present disclosure.

FIG. 5 shows a block diagram of an illustrative tire inflation system (e.g., system 500), having a valve block pressure sensor, in accordance with some embodiments of the present disclosure. To illustrate, system 500 may be same as or similar to tire inflation system 240 or FIG. 2, system 140 of vehicle 100 of FIG. 1, or both. To illustrate further, system 500 may correspond to system 400, wherein sensor 319 is included as part of assembly 310, and sensors 381-384 may be omitted (e.g., optionally sensors 381-384 may be retained). Further, sensor 319 may be included in any suitable system of the present disclosure (e.g., system 300 of FIG. 3). In an illustrative example, sensor 319 may include a pressure sensor communicatively coupled to control circuitry 210, such that the pressure of block 311 may be monitored by control circuitry 210 without the need for sensors 381-384 installed in tires of wheels 371-374. During operation of system 500, in order to check the pressure of any tire, the respective valves must be opened sequentially. For example, illustrated by the bolded lines, if the tire of wheel 371 is to be checked, then valves 401 and 321 are opened and all of valves 318, 322-324, and 404-404 are closed, such that sensor 319 is fluid-coupled to the tire of wheel 371 only (e.g., and not any other tire or atmosphere). In some embodiments, subsets of tires of wheels 371-374 may be checked. For example, valves 401, 402, 321, and 322 may be opened to check the tiers of both wheels 371 and 372 simultaneously. In some embodiments, in the context of system 500, control circuitry 210 may monitor each tire in sequence, at any suitable frequency, predetermined time, or in response to any suitable event or trigger.

Figure 6:
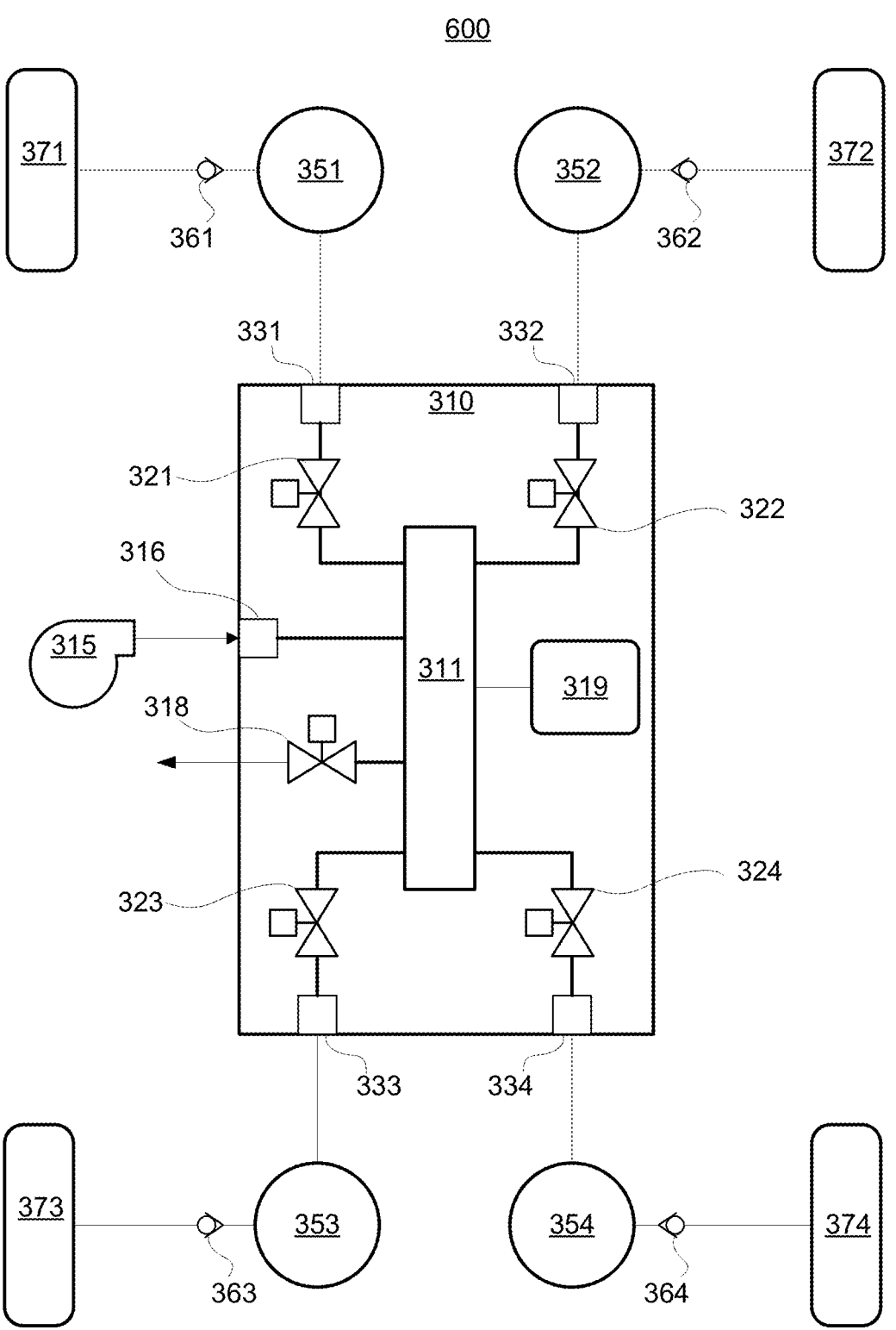
FIG. 6 shows a block diagram of another illustrative tire inflation system, having check valves, in accordance with some embodiments of the present disclosure.

FIG. 6 shows a block diagram of an illustrative tire inflation system (e.g., system 600), having check valves, in accordance with some embodiments of the present disclosure. To illustrate, system 600 may be same as or similar to tire inflation system 240 or FIG. 2, system 140 of vehicle 100 of FIG. 1, or both. To illustrate further, system 600 may correspond to system 300, wherein sensor 319 is included as part of assembly 310, sensors 381-384 may be omitted (e.g., optionally sensors 381-384 may be retained), and PRVs 391-394 may be omitted (e.g., optionally PRVs 391-394 may be retained). In some embodiments, system 600 may be used to provide pressurized air to tires of wheels 371-374 at a predetermined frequency, or at any other suitable time or duration. In a further example, block 311 may be pressurized and any or all of valves 321-324 may be opened to communicate pressure to tires of wheels 371-374. To illustrate, the change in pressure as measured by sensor 319 may be monitored. The rate of pressure decrease may be used to determine a flowrate, effective pressure of the tire, or a pressure differential between the tire and the pressure of block 319. Control circuitry 210 may control each of valves 321-324 based on a measured pressure using sensor 319. In some embodiments, when air is flowing to a tire, control circuitry 210 may estimate the tire pressure based on the pressure of block 311 and a rate of change of the pressure. Check valves 361-364 limit air flow to a single direction, which may limit deflation of the tires. In some embodiments, for example, each valve of check valves 361-364 is arranged in series with a controllable valve of valves 321-324 and in series with a respective wheel of wheels 371-374.

Figure 7:
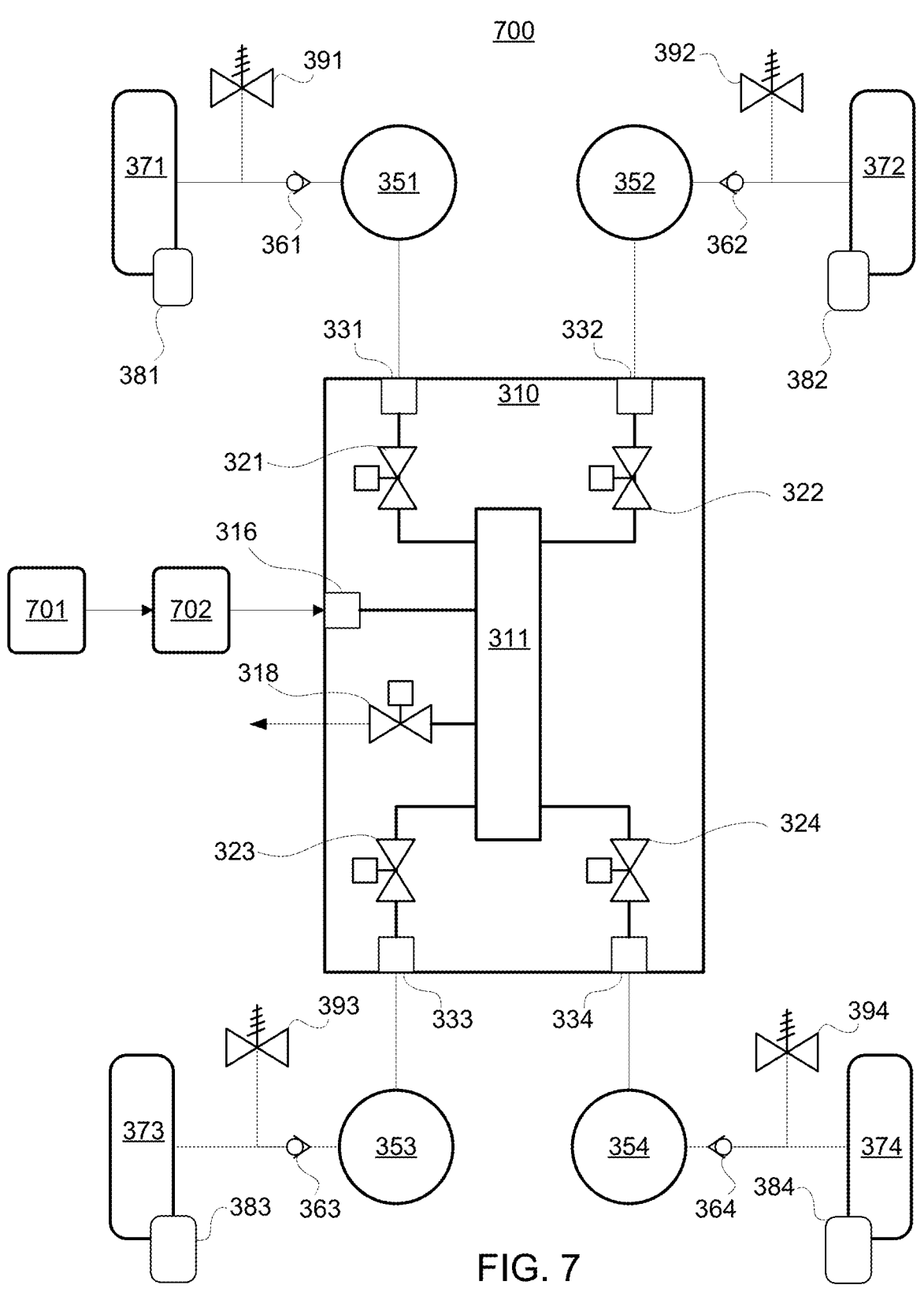
FIG. 7 shows a block diagram of another illustrative tire inflation system, using a gas source, in accordance with some embodiments of the present disclosure.

FIG. 7 shows a block diagram of an illustrative tire inflation system (e.g., system 700), using a gas source, in accordance with some embodiments of the present disclosure. To illustrate, system 700 may be same as or similar to tire inflation system 240 or FIG. 2, system 140 of vehicle 100 of FIG. 1, or both. To illustrate further, system 700 may correspond to system 300, wherein source 701 and optional pressure regulator 702 are included to provide pressurized air (e.g., in place of or in addition to compressor 315). In some embodiments, source 701 may correspond to pneumatic system 260 of FIG. 2 (e.g., corresponding to a suspension system or other suitable system), and pressure regulator 702 may be included to regulate the pressure to a target range for inflating tires of wheels 371-374. In an illustrative example, source 701 may be used to provide air to any of the systems of the present disclosure such as systems 400, 500, or 600, or any other suitable system. Pressure regulator 702 may be, but need not be, included, and may be set to a predetermined pressure, or otherwise be controllable (e.g., controlled by control circuitry 210).

Figures 8, 9:
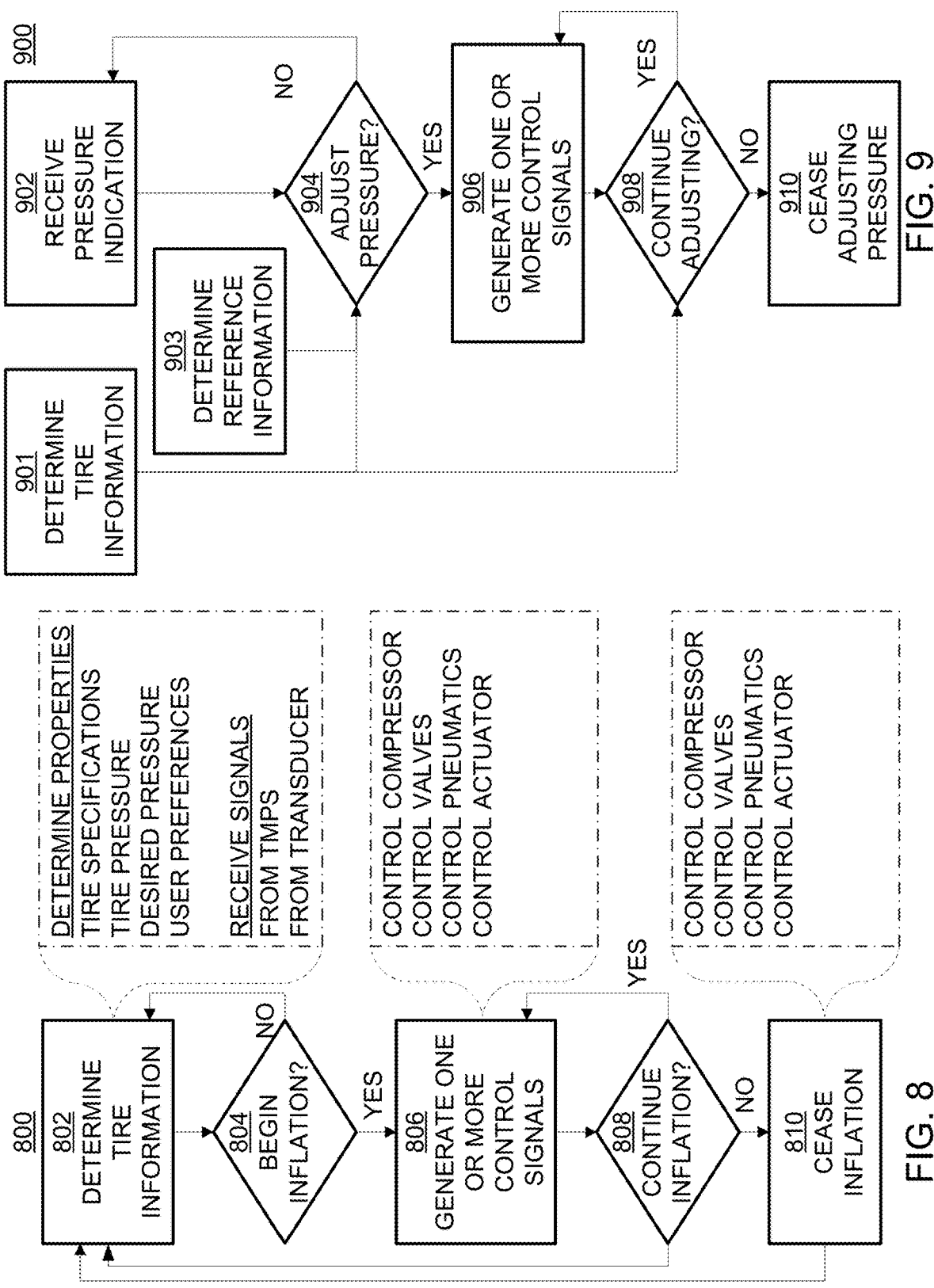
FIG. 8 is a flowchart of an illustrative process for controlling tire pressure, in accordance with some embodiments of the present disclosure.
FIG. 9 is a flowchart of an illustrative process for controlling tire pressure in response to an indication, in accordance with some embodiments of the present disclosure.

FIG. 8 is a flowchart of illustrative process 800 for controlling tire pressure, in accordance with some embodiments of the present disclosure. To illustrate, control system 120 of FIG. 1, or control circuitry 210 of FIG. 2 may be used to control system 140 of FIG. 1 or tire inflation system 240 of FIG. 2 to implement process 800. In a further example, any of systems 300, 400, 500, 600, or 700 of FIGS. 3-7, or combination thereof, may be used to implement process 800.

Step 802 includes the system determining tire information for one or more tires of a vehicle. Tire information may include a current pressure value for each tire (e.g., an array of pressure values), a time-history of pressure values for each tire (e.g., sampled pressure values with time indexes), user preferences (e.g., target operating range or limits), reference information, any other suitable information, or any combination thereof. Reference information may include, for example, a model number of a tire, serial number of a tire, type of tire, size of tire, maximum pressure rating, target pressure rating, minimum pressure, life or remaining life, position (e.g., front/rear, left/right), any other reference information (e.g., aside from operating information), or any combination thereof. To illustrate, tire information may be inputted and stored in memory 219, and recalled by processor 212 during process 800. In some embodiments, the system may determine tire information at a regular interval or frequency, in response to a suitable criterion (e.g., vehicle speed, gear, motion, location, or occupant), in response to a query, in response to an event (e.g., at vehicle startup), at any other suitable time, or any combination thereof. To illustrate, step 802 may include determining a measured tire pressure (e.g., for each tire of a vehicle). In some embodiments, at step 802, the system may open one or more valves to communicate tire pressure to one or more sensors that may be remote from the wheel and wheel hub (e.g., sensor 319).

Step 804 includes the system determining whether to begin inflation (or deflation). In some embodiments, the system may determine whether to begin inflation or deflation based on the tire information of step 802. In some embodiments, step 804 includes comparing a measured pressure from step 802 to a reference value (e.g., an upper limit, lower limit, or both such as a range) to determine whether to inflate or deflate one or more tires. In some embodiments, the system may determine whether to inflate one or more tires at step 804 based on user input (e.g., to user interface 206), indicating a target pressure or inflation state (e.g., 100%, 90%, 80%, 70%, 60%, 50% full, or any other suitable designation). In some embodiments, if, at step 804, the system determines inflation (or deflation) is not needed, the system may return to step 802 or otherwise continue to monitor the pressures until inflation (or deflation) is needed.

Step 806 includes the system generating one or more control signals (e.g., if tire adjustment is determined to be needed at step 804). In some embodiments, the system generates control signals for a compressor, one or more controllable valves, a pressure regulator, any other suitable components, or any combination thereof. In some embodiments, the system generates a digital ON or OFF signal for a plurality of solenoid valves (e.g., valves 318, 321-324, and/or 41-404) based on a target flow path. For example, the system may generate a vector of values corresponding to valve states, and output the control signals based on the vector (e.g., "1" may correspond to ON, "0" may correspond to OFF). In a further example, the system may generate an analog output, PWM output, or other suitable variable-output to control a valve to a target position or state (e.g., corresponding to a target open area, $C_v$, or pressure drop). In some embodiments, the system generates an analog output, a PWM output, a PDM output, or any other suitable variable output, or otherwise include a motor controller or variable frequency drive, to control operation of the compressor (e.g., compressor 315). For example, the system may control the shaft speed of the compressor, the output pressure of the compressor, the pressure change across the compressor, any other suitable property of the compressor or compressed air, or any combination thereof, using the control signal. In some embodiments, the system may generate one or more control signals to control a pneumatic component (e.g., valving, regulators, filters, diverters), actuator (e.g., to perform any suitable actuation), or any other suitable component. In some embodiments, I/O 216, relays 214, or a combination thereof are configured to generate and transmit the control signals.

Step 808 includes the system determining whether to continue inflation (or deflation). As the control signals of step 806 cause changes in aspects of one or more tires (e.g., pressure), the system may compare updated tire information (e.g., updated measurements of tire pressure), or changes thereof to determine whether to continue generating the control signals. In some embodiments, the determination of step 808 may depend on a counter. For example, the system may generate the one or more control signals at step 806 for a predetermined duration of time. In a further example, the system may generate the one or more control signals to deliver a predetermined amount of air (e.g., the counter may correspond to units of air delivered). In some embodiments, the system may determine whether to continue inflation (or deflation) based on user input received at user interface 206. For example, a user may prompt the system to begin inflation (or deflation), and then the user may prompt the system to stop inflation (or deflation) when the tire pressure reaches the user's desired pressure or otherwise state of inflation.

Step 810 includes the system ceasing inflation based on the determination of step 808. In some embodiments, the system may determine at step 808 to discontinue inflation (or deflation) and accordingly cease providing or removing air from one or more tires of the vehicle. In some embodiments, step 810 includes generating and transmitting, or stopping the generation and transmission of, a control signal to compressor 315 to cease operation or otherwise achieve a standby mode. In some embodiments, step 810 includes generating and transmitting a control signal to open valve 318 to vent block 311. In some embodiments, the system may perform step 810 and then return to step 802 to monitor tire pressure.

In an illustrative example, the system may monitor tire pressure for four tires by combining steps 802 and 804 to repeatedly compare measured tire pressure to a reference value. If the measured pressure of any one tire is low, the system may generate control signals at step 806 to activate the compressor and open one or more valves to fluidly couple the compressor outlet to the tire exhibiting low pressure. The system may continue to monitor the tire pressure and when the pressure within the target range (e.g., greater than a lower threshold in this example), the system may de-activate the compressor and close the valves that were opened. In some circumstances, the system may vent the compressor outlet (e.g., using valve 318).

FIG. 9 is a flowchart of illustrative process 900 for controlling tire pressure in response to an indication, in accordance with some embodiments of the present disclosure. To illustrate, control system 120 of FIG. 1, or control circuitry 210 of FIG. 2 may be used to control system 140 of FIG. 1 or tire inflation system 240 of FIG. 2 to implement process 900. In a further example, any of systems 300, 400, 500, 600, or 700 of FIGS. 3-7, or combination thereof, may be used to implement process 900. In a further example, process 900 may be implemented in any suitable manner, and may, for example, overlap, be similar to, or result in the same actions as process 800 of FIG. 8. Steps of processes 900 and 800 may be combined, omitted, rearranged, or otherwise modified in any suitable manner, in accordance with the present disclosure.

Step 901 includes the system determining tire information for one or more tires of a vehicle. Tire information may include one or more pressure values for each tire, preset preferences, reference information, any other suitable information, or any combination thereof. Reference information may include, for example, a model number of a tire, serial number of a tire, type of tire, size of tire, maximum pressure rating, target pressure rating, minimum pressure, life or remaining life, wheel position, any other reference information, or any combination thereof. To illustrate, tire information may be inputted and stored in memory 219, and recalled by processor 212 during step 901. In some embodiments, the system may determine tire information at a regular interval or frequency, in response to a suitable criterion, in response to a query, in response to an event (e.g., at vehicle startup), at any other suitable time, or any combination thereof. To illustrate, step 901 may include determining a measured tire pressure for each tire of a vehicle (e.g., one or more control valves to expose a pressure sensor to gas of each respective wheel. In some embodiments, at step 802, the system may open one or more valves to communicate tire pressure to one or more sensors that may be remote from the wheel and hub (e.g., sensor 319). Step 901 may be performed at any suitable time during process 900, at multiple times during process 900, before process 900 is implemented (e.g., during monitoring of tires under normal operation), or a combination thereof.

Step 902 includes the system receiving one or more pressure indications. For example, in some embodiments, the system may receive a pressure indication from a user interface, as inputted by a user. For example, the user may input a pressure indication to a dash console (e.g., a touchscreen thereof, or hard selectors such as buttons, knobs, or switches thereof), a center console, a user device (e.g., a touchscreen thereof), a key fob (e.g., hard button thereof), any other suitable interface, or any combination thereof. In some embodiments, a user may prefer a lessened or increased tire pressure based on road conditions. For example, for off-roading, rock-crawling, driving through mud, snow, or sand, or other potentially slip-inducing terrain, the user may prefer a lowered tire pressure (e.g., to increase surface area and thus frictional forces). Accordingly, the user may input a numerical value as a target tire pressure, a percentage decrease, an incremental decrease, or any other suitable indicator of the tire pressure. In a further example, the user may enter a pressure that corresponds to existing tire pressure, as measured. At step 902, the system receives the indication and then determines an action to take at step 904.

Step 903 includes the system determining reference information. Reference information may include, for example, map portions, routes, road conditions, traffic conditions, any other suitable information from any suitable source, or any combination thereof. In some embodiments, the system may retrieve reference information from memory (e.g., memory 219), which may be stored, updated, downloaded, or otherwise compiled for recall. In some embodiments, the system retrieves the reference information from an external source (e.g., a server, a remote network device, a user device) via a network link or other communications link. For example, in some embodiments, the system queries the external source for information, and then receives a response that may include the reference information. In a further example, the system may receive information from an information source at a predetermined frequency (e.g., at or along regular time intervals), in response to an event (e.g., at vehicle startup, when occupant is detected, when requested), at any other suitable time or times, or any combination thereof. In some embodiments, the system may determine reference information before (e.g., as a trigger), during (e.g., simultaneous with), or after (e.g., in response to) either of steps 901 or 902. In some embodiments, the system may determine information by combining steps 901 and 903, and then may proceed to step 904 based on the information (e.g., aggregate information or otherwise a collection of different types of information).

Step 904 includes the system determining whether to adjust tire pressure. In some embodiments, the system may determine whether to adjust tire pressure based on the tire information of step 901. For example, in some embodiments, the system may determine whether to adjust tire pressure based on the tire information of step 901, reference information of step 903, an indication of step 902, or any combination thereof. In some embodiments, the system may determine whether to adjust tire pressure based on the indication of step 902. The system may, for example, compare a pressure indication of step 902 and tire information of step 901 (e.g., measured tire pressure) to determine whether to the pressure of one or more tires is to be adjusted. In some embodiments, the system may compare a plurality of measured values to one or more target values to determine whether to increase (e.g., the measured pressure is less than the target) or decrease (e.g., the measured pressure is greater than the target) tire pressure. In some embodiments, the system may make a determination at step 904 for each tire (e.g., four determinations for four tires) and thus generate four "YES" or "NO" flags. In some embodiments, the system may generate a single determination at step 904. For example, the system may determine if any (e.g., at least one) tire requires adjustment and then generate a "YES" flag. In some embodiments, the system may compare a target pressure and determine whether a measured pressure is within a threshold of the target pressure. If so, the system may determine to that adjustment is not required. If the system determines that the measured pressure is not within a threshold of the target pressure, the system may determine that adjustment is needed.

Step 906 includes the system generating one or more control signals (e.g., if tire adjustment is determined to be needed at step 804). Based on a determination at step 904 to adjust pressure, the system may generate one or more control signals to cause adjustment of tire pressure. For example, at step 906, the system may generate control signals for one or more control valves, one or more compressors, one or more pressure regulators, any other suitable components, or any combination thereof.

Step 908 includes the system determining whether to continue adjusting tire pressure (e.g., similar to step 808 of FIG. 8). As the one or more control signals of step 906 cause changes in aspects of one or more tires (e.g., pressure), the system may compare updated tire information (e.g., updated measurements of tire pressure), or changes thereof to determine whether to continue generating the control signals. In some embodiments, the determination of step 908 may depend on a counter. For example, the system may generate the one or more control signals at step 906 for a predetermined duration of time (e.g., as monitored by the counter). In a further example, the system may generate the one or more control signals to deliver a predetermined amount of air (e.g., the counter may correspond to units of air delivered). In some embodiments, the system may determine whether to continue inflation (or deflation) based on user input received at user interface 206. For example, a user may prompt the system to begin inflation (or deflation), and then the user may prompt the system to stop inflation (or deflation) when the tire pressure reaches the user's desired pressure or otherwise state of inflation.

Step 910 includes the system ceasing adjustment of tire pressure based on step 908 (e.g., similar to step 810 of FIG. 8). Step 910 includes the system ceasing inflation based on the determination of step 908. In some embodiments, the system may determine at step 808 to discontinue inflation (or deflation) and accordingly cease providing or removing air from one or more tires of the vehicle. In some embodiments, step 910 includes generating and transmitting, or stopping the generation and transmission of, a control signal to compressor 315 to cease operation or otherwise achieve a standby mode. In some embodiments, step 910 includes generating and transmitting a control signal to open valve 318 to vent block 311. In some embodiments, the system may perform step 910 and then return to step 902 to receive an indication.

Figure 10:
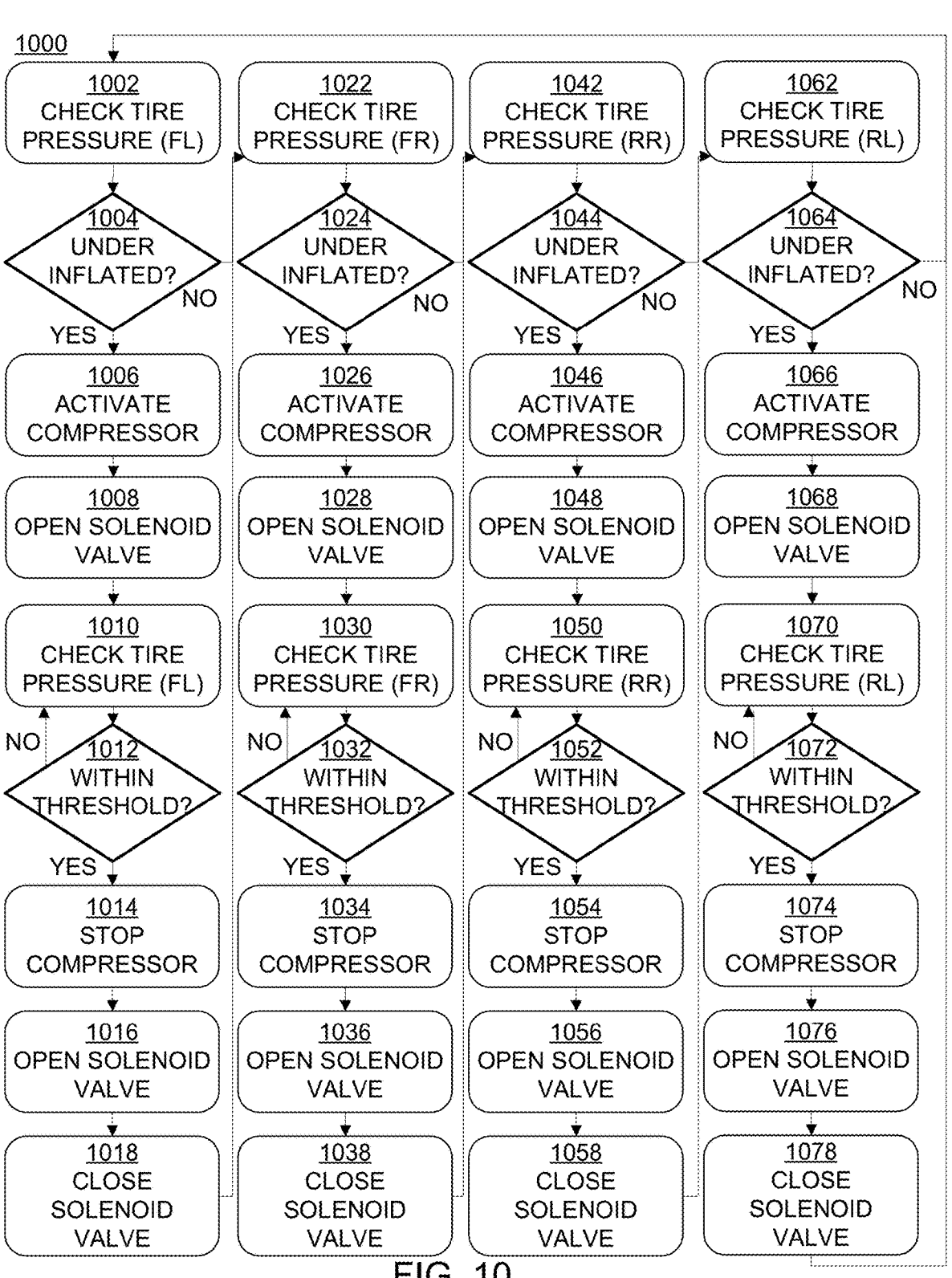
FIG. 10 is a flowchart of an illustrative process for controlling tire inflation for four tires using control valves, in accordance with some embodiments of the present disclosure.

FIG. 10 is a flowchart of illustrative process 1000 for controlling tire inflation for four tires using control valves, in accordance with some embodiments of the present disclosure. Process 1000 may be implemented to inflate four wheels of a vehicle in sequence. For example, a vehicle may include front left (FL), front right (FR), rear right (RR), and rear left (RL) tires. Accordingly, steps 1002-1018 correspond to FL (e.g., wheel 371), steps 1022-1038 correspond to FR (e.g., wheel 372), steps 1042-1058 correspond to RR (e.g., wheel 374), and steps 1062-1078 correspond to RL (e.g., wheel 373). To illustrate, process 1000 may be implemented to control system 300 of FIG. 3.

At step 1002, the system checks tire pressure (e.g., for the FL tire, using sensor 381). For example, step 1002 may be initiated in response to an indication from the system, an indication from a user, on a predetermined schedule, in response to an event (e.g., vehicle startup, occupancy, motion), any other suitable criterion, or any combination thereof. At step 1004, the system determines whether the FL tire is under-inflated (e.g., 5% or more under-inflated below a lower limit) based on the measured pressure (e.g., from sensor 381). If not under-inflated, the system proceeds to the FR tire. If the FL tire is under-inflated, the system proceeds to step 1006. At step 1006, the system activates a compressor (e.g., compressor 315) to provide pressurized air. At step 1008, the system opens one or more solenoid valves (e.g., valve 321 which may include any suitable type of control valve), and at step 1010, the system checks the tire pressure of the FL tire again to determine whether the pressure is within the threshold (e.g., within 1 psi of the target pressure) at step 1012. If the pressure is not within the threshold, the system continues to inflate the FL tire and check pressure at step 1010 until the threshold is reached. Once the threshold is reached (e.g., as determined at step 1012), the system stops the compressor at step 1014. The system then opens and closes one or more solenoid valves (e.g., valve 318) at steps 1016-1018 to vent the system.

At step 1022, the system checks tire pressure (e.g., for the FR tire, using sensor 382). For example, step 1022 may be initiated in response to an indication from the system, an indication from a user, on a predetermined schedule, in response to an event (e.g., vehicle startup, occupancy, motion), any other suitable criterion, or any combination thereof. At step 1024, the system determines whether the FR tire is under-inflated (e.g., 5% or more under-inflated below a lower limit) based on the measured pressure (e.g., from sensor 382). If not under-inflated, the system proceeds to the RR tire. If the FR tire is under-inflated, the system proceeds to step 1026. At step 1026, the system activates a compressor (e.g., compressor 315) to provide pressurized air. At step 1028, the system opens one or more solenoid valves (e.g., valve 322 which may include any suitable type of control valve), and at step 1030, the system checks the tire pressure of the FR tire again to determine whether the pressure is within the threshold (e.g., within 1 psi of the target pressure)

at step 1032. If the pressure is not within the threshold, the system continues to inflate the FR tire and check pressure at step 1030 until the threshold is reached. Once the threshold is reached (e.g., as determined at step 1032), the system stops the compressor at step 1034. The system then opens and closes one or more solenoid valves (e.g., valve 318) at steps 1036-1038 to vent the system.

At step 1042, the system checks tire pressure (e.g., for the RR tire, using sensor 384). For example, step 1042 may be initiated in response to an indication from the system, an indication from a user, on a predetermined schedule, in response to an event (e.g., vehicle startup, occupancy, motion), any other suitable criterion, or any combination thereof. At step 1044, the system determines whether the RR tire is under-inflated (e.g., 5% or more under-inflated below a lower limit) based on the measured pressure (e.g., from sensor 384). If not under-inflated, the system proceeds to the RL tire. If the RR tire is under-inflated, the system proceeds to step 1046. At step 1046, the system activates a compressor (e.g., compressor 315) to provide pressurized air. At step 1048, the system opens one or more solenoid valves (e.g., valve 324 which may include any suitable type of control valve), and at step 1050, the system checks the tire pressure of the RR tire again to determine whether the pressure is within the threshold (e.g., within 1 psi of the target pressure) at step 1052. If the pressure is not within the threshold, the system continues to inflate the RR tire and check pressure at step 1050 until the threshold is reached. Once the threshold is reached (e.g., as determined at step 1052), the system stops the compressor at step 1054. The system then opens and closes one or more solenoid valves (e.g., valve 318) at steps 1056-1058 to vent the system.

At step 1062, the system checks tire pressure (e.g., for the RL tire, using sensor 383). For example, step 1062 may be initiated in response to an indication from the system, an indication from a user, on a predetermined schedule, in response to an event (e.g., vehicle startup, occupancy, motion), any other suitable criterion, or any combination thereof. At step 1064, the system determines whether the RL tire is under-inflated (e.g., 5% or more under-inflated below a lower limit) based on the measured pressure (e.g., from sensor 383). If not under-inflated, the system proceeds to repeat the process (e.g., at the FL tire). If the RL tire is under-inflated, the system proceeds to step 1066. At step 1066, the system activates a compressor (e.g., compressor 315) to provide pressurized air. At step 1068, the system opens one or more solenoid valves (e.g., valve 323 which may include any suitable type of control valve), and at step 1070, the system checks the tire pressure of the RL tire again to determine whether the pressure is within the threshold (e.g., within 1 psi of the target pressure) at step 1072. If the pressure is not within the threshold, the system continues to inflate the RL tire and check pressure at step 1070 until the threshold is reached. Once the threshold is reached (e.g., as determined at step 1072), the system stops the compressor at step 1074. The system then opens and closes one or more solenoid valves (e.g., valve 318) at steps 1076-1078 to vent the system.

In an illustrative example, the system may omit step 1014 while proceeding from tire to tire such that cycling the compressor is not needed. Further, the system need not follow any particular order of tires and may check in any suitable order. In some embodiments, the system may check all of the tire pressures first, and then actuate more than one valve (e.g., one or more of steps 1008, 1028, 1048, and 1068 may be combined) to inflate more than one tire at a time. In some embodiments, the system need not vent the plumbing while performing process 1000 (e.g., steps 1016, 1018, 1036, 1038, 1056, and 1058 may be omitted and only 1076 and 1078 performed). In some embodiments, depending on whether a check valve (e.g., of check valves 361-364) is included, the system may open and close valves 321-324 before stopping the compressor and venting (e.g., to prevent deflation). For example, if a check valve is included, then venting should not affect tire pressure (e.g., air cannot flow out of the tires back through valves 321-324).

Figure 11:
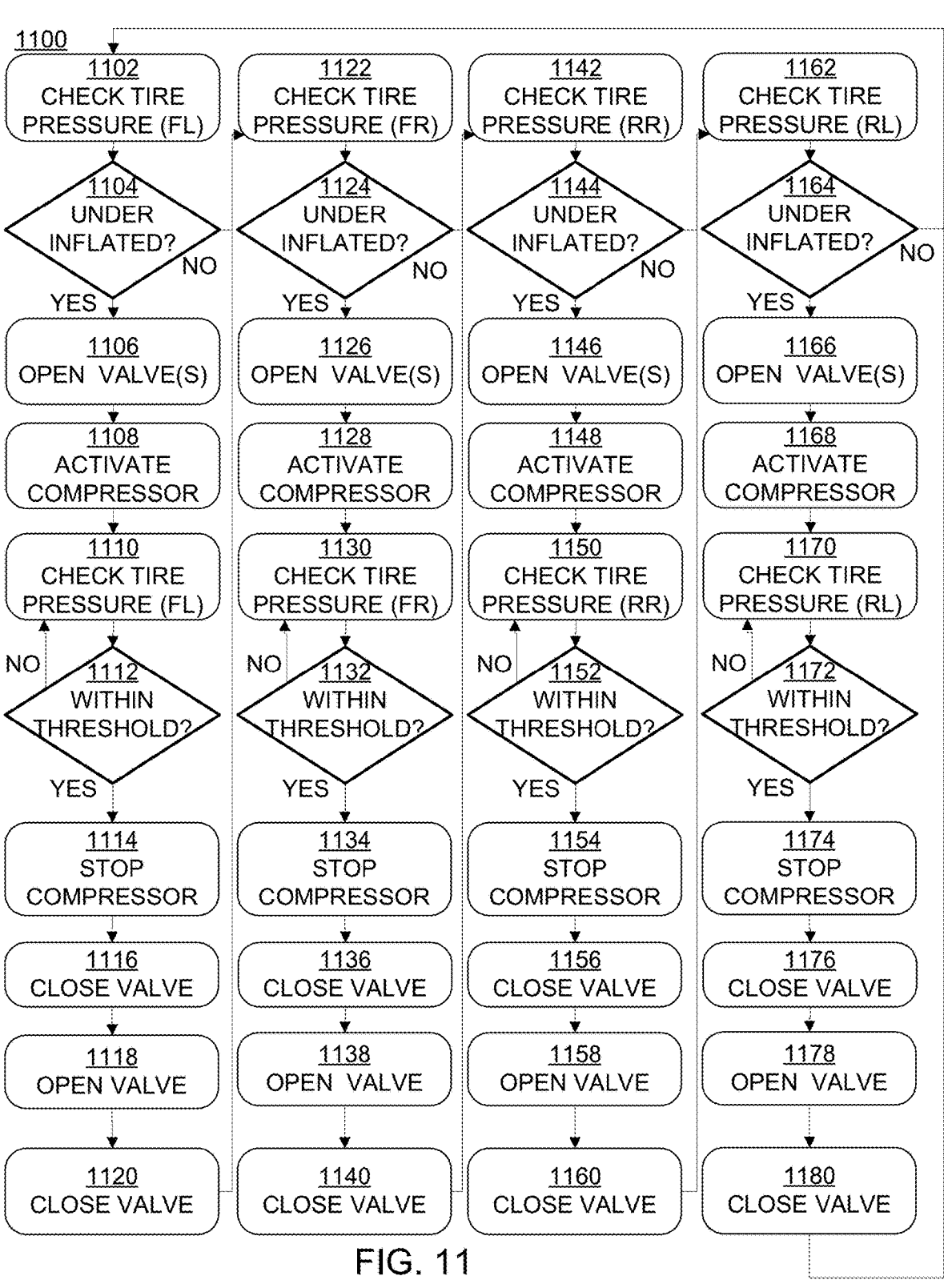
FIG. 11 is a flowchart of another illustrative process for controlling tire inflation for four tires using control valves, in accordance with some embodiments of the present disclosure.

FIG. 11 is a flowchart of illustrative process 1100 for controlling tire inflation for four tires using control valves, in accordance with some embodiments of the present disclosure. To illustrate, process 1000 may be implemented to control system 400 of FIG. 4.

At step 1102, the system checks tire pressure (e.g., for the FL tire, using sensor 381). For example, step 1102 may be initiated in response to an indication from the system, an indication from a user, on a predetermined schedule, in response to an event (e.g., vehicle startup, occupancy, motion), any other suitable criterion, or any combination thereof. At step 1104, the system determines whether the FL tire is under-inflated (e.g., 5% or more under-inflated below a lower limit) based on the measured pressure (e.g., from sensor 381). If not under-inflated, the system proceeds to the FR tire. If the FL tire is under-inflated, the system proceeds to step 1106. At step 1106, the system opens one or more solenoid valves (e.g., valves 321 and 401) which may include any suitable type of control valve. At step 1108, the system activates a compressor (e.g., compressor 315) to provide pressurized air. At step 1110, the system checks the tire pressure of the FL tire again to determine whether the pressure is within the threshold (e.g., within 1 psi of the target pressure) at step 1112. If the pressure is not within the threshold, the system continues to inflate the FL tire and check pressure at step 1110 until the threshold is reached. Once the threshold is reached (e.g., as determined at step 1112), the system stops the compressor at step 1114. The system then closes one or more solenoid valves (e.g., valve 401) at step 1116, and then opens and closes a valve (e.g., valve 318) to vent the system at steps 1118-1120. The system also closes another valve (e.g., valve 321) such that the FL tire does not deflate because the flow path is closed.

At step 1122, the system checks tire pressure (e.g., for the FR tire, using sensor 382). For example, step 1122 may be initiated in response to an indication from the system, an indication from a user, on a predetermined schedule, in response to an event (e.g., vehicle startup, occupancy, motion), any other suitable criterion, or any combination thereof. At step 1124, the system determines whether the FR tire is under-inflated (e.g., 5% or more under-inflated below a lower limit) based on the measured pressure (e.g., from sensor 382). If not under-inflated, the system proceeds to the RR tire. If the FR tire is under-inflated, the system proceeds to step 1126. At step 1126, the system opens one or more solenoid valves (e.g., valves 322 and 402) which may include any suitable type of control valve. At step 1128, the system activates a compressor (e.g., compressor 315) to provide pressurized air. At step 1130, the system checks the tire pressure of the FR tire again to determine whether the pressure is within the threshold (e.g., within 1 psi of the target pressure) at step 1132. If the pressure is not within the threshold, the system continues to inflate the FR tire and check pressure at step 1130 until the threshold is reached. Once the threshold is reached (e.g., as determined at step 1132), the system stops the compressor at step 1134. The system then closes one or more solenoid valves (e.g., valve 402) at step 1136, and then opens and closes a valve (e.g., valve 318) to vent the system at steps 1138-1140. The system also closes another valve (e.g., valve 322) such that the FR tire does not deflate because the flow path is closed.

At step 1142, the system checks tire pressure (e.g., for the RR tire, using sensor 384). For example, step 1142 may be initiated in response to an indication from the system, an indication from a user, on a predetermined schedule, in response to an event (e.g., vehicle startup, occupancy, motion), any other suitable criterion, or any combination thereof. At step 1144, the system determines whether the RR tire is under-inflated (e.g., 5% or more under-inflated below a lower limit) based on the measured pressure (e.g., from sensor 384). If not under-inflated, the system proceeds to the RL tire. If the RR tire is under-inflated, the system proceeds to step 1146. At step 1146, the system opens one or more solenoid valves (e.g., valves 324 and 404) which may include any suitable type of control valve. At step 1148, the system activates a compressor (e.g., compressor 315) to provide pressurized air. At step 1150, the system checks the tire pressure of the RR tire again to determine whether the pressure is within the threshold (e.g., within 1 psi of the target pressure) at step 1152. If the pressure is not within the threshold, the system continues to inflate the RR tire and check pressure at step 1150 until the threshold is reached. Once the threshold is reached (e.g., as determined at step 1152), the system stops the compressor at step 1154. The system then closes one or more solenoid valves (e.g., valve 404) at step 1156, and then opens and closes a valve (e.g., valve 318) to vent the system at steps 1158-1160. The system also closes another valve (e.g., valve 324) such that the RR tire does not deflate because the flow path is closed.

At step 1162, the system checks tire pressure (e.g., for the RL tire, using sensor 383). For example, step 1162 may be initiated in response to an indication from the system, an indication from a user, on a predetermined schedule, in response to an event (e.g., vehicle startup, occupancy, motion), any other suitable criterion, or any combination thereof. At step 1164, the system determines whether the RL tire is under-inflated (e.g., 5% or more under-inflated below a lower limit) based on the measured pressure (e.g., from sensor 383). If not under-inflated, the system proceeds to repeat the process (e.g., at the FL tire). If the RL tire is under-inflated, the system proceeds to step 1166. At step 1166, the system opens one or more solenoid valves (e.g., valves 323 and 403) which may include any suitable type of control valve. At step 1168, the system activates a compressor (e.g., compressor 315) to provide pressurized air. At step 1170, the system checks the tire pressure of the RL tire again to determine whether the pressure is within the threshold (e.g., within 1 psi of the target pressure) at step 1172. If the pressure is not within the threshold, the system continues to inflate the RL tire and check pressure at step 1170 until the threshold is reached. Once the threshold is reached (e.g., as determined at step 1172), the system stops the compressor at step 1174. The system then closes one or more solenoid valves (e.g., valve 403) at step 1176, and then opens and closes a valve (e.g., valve 318) to vent the system at steps 1178-1180. The system also closes another valve (e.g., valve 323) such that the RR tire does not deflate because the flow path is closed.

In an illustrative example, the system need not follow any particular order of tires and may check in any suitable order. In a further example, the system need not cycle the compressor (e.g., steps 1108 and 1114 for FL) for each tire and may run the compressor until all four tires are inflated. In some embodiments, the system may check all of the tire pressures first, and then actuate more than one valve (e.g., one or more of steps 1106, 1126, 1146, and 1166 may be combined) to inflate more than one tire at a time. In some embodiments, the system need not vent the plumbing while performing process 1100 (e.g., steps 1118, 1120, 1138, 1140, 1158, and 1160 may be omitted and only 1178 and 1180 performed). In some embodiments, the system may open and close valves 321-324 and 401-404 together for each tire (e.g., valve 321 and 401 opened and closed together). In some embodiments, all of valves 321-324 or valves 401-404 are opened when process 1100 commences, and the other inline valve is controlled to control inflation (e.g., if valve 401 is opened initially, valve 321 may be used for control).

Figure 12:
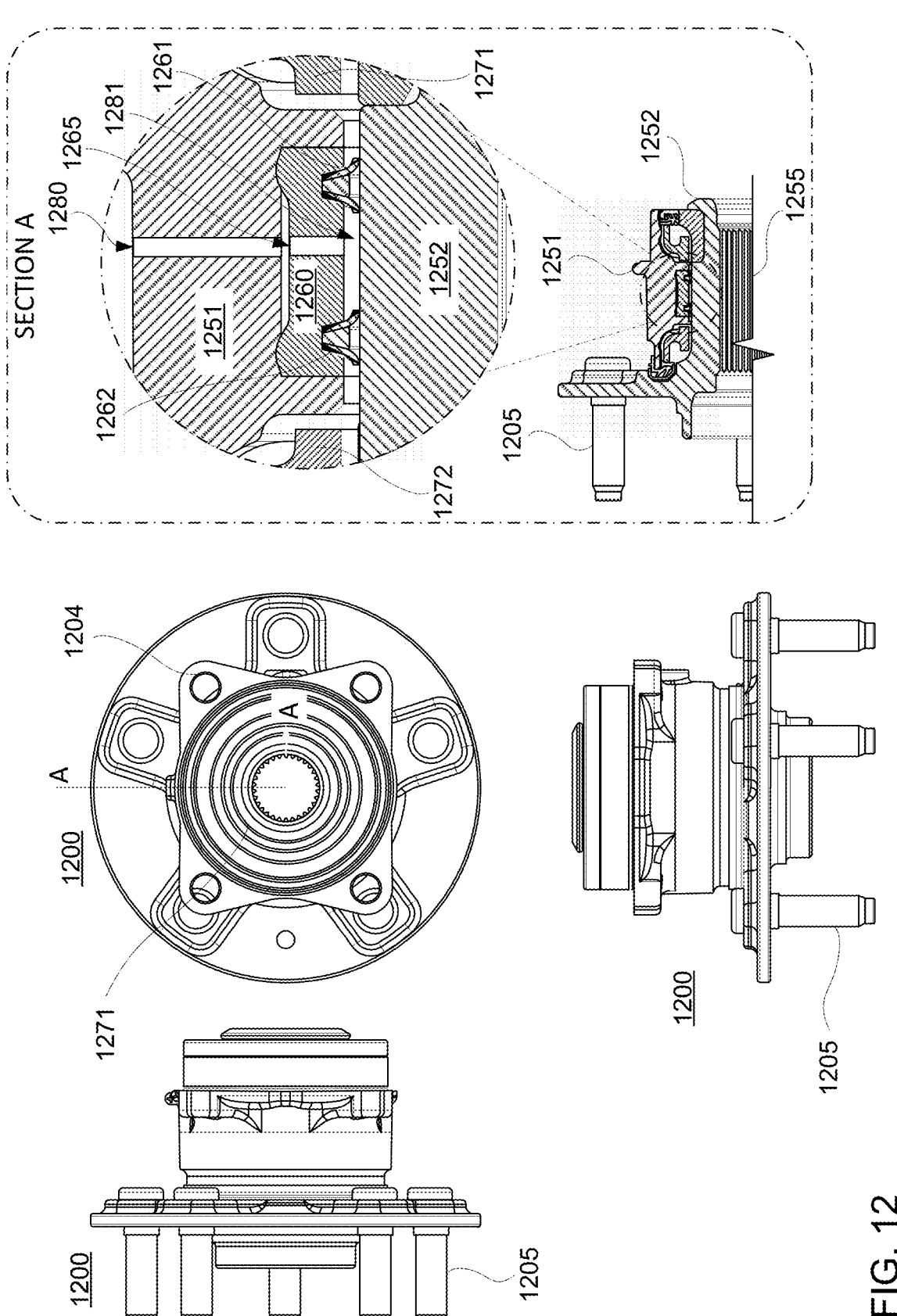
FIG. 12 shows front, side, and bottom views of an illustrative hub, along with a cross-section illustrating a seal, in accordance with some embodiments of the present disclosure.

FIG. 12 shows front, side, and bottom views of illustrative hub 1200, along with a cross-section illustrating a seal (e.g., seal 1260 having seal elements 1261 and 1262), in accordance with some embodiments of the present disclosure. To illustrate, hub 1200 may correspond to any or all of hub assembly 241 of FIG. 2, or hubs 351-354 illustrated in FIGS. 3-7. As illustrated, hub 1200 includes studs 1205 configured to mount a wheel, and stationary element 1251 coupled to rotary element 1252 with bearings 1271 and 1272. Bearings 1271 and 1272 may be tapered roller bearings, ball bearings, or any other suitable bearing type or combination of types. Stationary element 1251 may be affixed to the vehicle frame or other stationary structural component (e.g., using features 1204, illustrated as through holes). Rotary element 1252 couples the wheel to a driveshaft, for example, using interface 1255 (e.g., a splined interface as illustrated). Seal 1260 is arranged radially between stationary element 1251 and rotary element 1252. Port 1280 is arranged in stationary element 1251 and includes a through recess, as illustrated (e.g., a through hole). For example, port 1280 may include suitable recess such as a hole, passage, slot, or combination thereof. Seal 1260 includes a collar with port 1265 included to allow gas flow into region 1281 (e.g., an annular gas volume). For example, port 1280 may be coupled to a pneumatic system (e.g., system 300, 400, 500, 600, or 700 of FIGS. 3-7), and be fluid-wise coupled to port 1265 to provide gas to region 1281. Seal elements 1261 and 1262 seal region 1281 and, optionally, may also seal bearings 1271 and 1272 in some embodiments (e.g., bearings 1271 and 1272 may be sealed or unsealed bearings). As illustrated, each of seal elements 1261 and 1262 includes two lips configured to seal region 1281 and optionally a bearing. In some embodiments, the lips of seal elements 1261 and 1262 need not seal when region 1281 is not pressurized, and when pressurized, gas pressure in region 1281 may press the lips against an outer surface of rotary element 1252. To illustrate, when region 1281 is not pressurized, the lips of seal elements 1261 and 1262 might not be in contact with rotary element 1252 and thus do not impart friction forces (e.g., or otherwise impart relatively lesser friction forces if the normal forces is not as great). In some embodiments, seal 1260 is arranged radially between stationary element 1251 and rotary element 1252, and is configured to seal a volume of air in region 1281 between stationary element 1251 and rotary element 1252. For example, port 1280 may be configured to direct air from the volume to a tire of a respective wheel mounted to hub 1200.

Figures 13, 14:
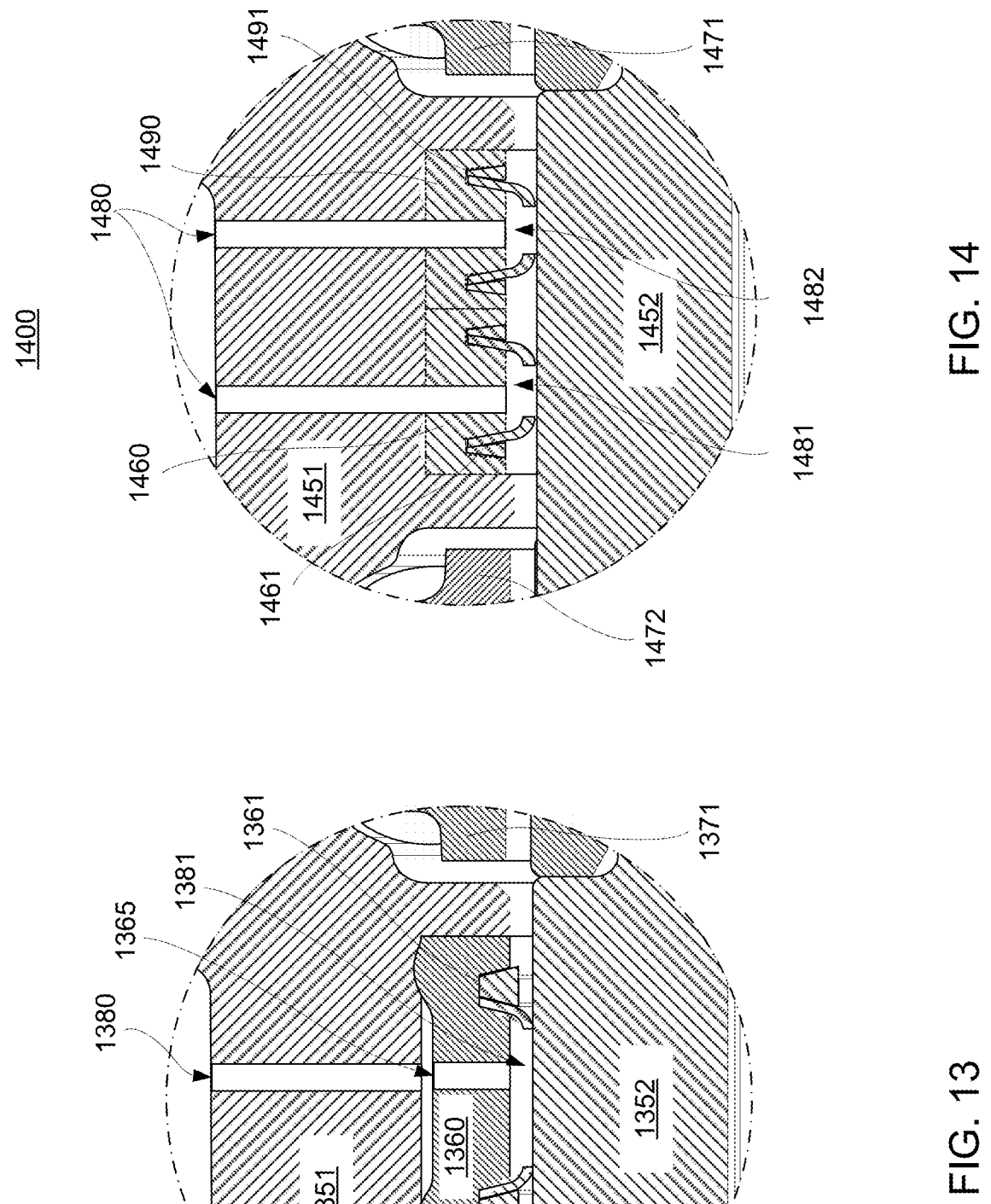
FIG. 13 shows a cross-section view of a portion of an illustrative hub having a seal, in accordance with some embodiments of the present disclosure.
FIG. 14 shows a cross-section view of a portion of another illustrative hub having a seal, in accordance with some embodiments of the present disclosure.

FIG. 13 shows a cross-section view of a portion of illustrative hub 1300 having a seal, in accordance with some embodiments of the present disclosure. As illustrated, hub 1300 includes stationary element 1351 coupled to rotary element 1352 with bearings 1371 and 1372. Bearings 1271 and 1272 are sealed bearings (e.g., from the atmosphere such that material cannot intrude into region 1381 from outside). Stationary element 1351 is affixed to the vehicle frame or other stationary structural component, while rotary element 1352 is coupled to the wheel (e.g., and to a driveshaft if the wheel is a driven wheel). Seal 1360 is arranged radially between stationary element 1351 and rotary element 1352. Port 1380 is arranged in stationary element 1351 and includes a through recess, as illustrated (e.g., a through hole). Seal 1360 includes a collar with port 1365 included to allow gas flow into region 1381. For example, port 1380 may be coupled to a pneumatic system (e.g., system 300, 400, 500, 600, or 700 of FIGS. 3-7), and be fluid-wise coupled to port 1365 to provide gas to region 1381. Seal elements 1361 and 1362 seal region 1381, and each include one lip configured to seal region 1281. In some embodiments, the respective lips of seal elements 1361 and 1362 need not seal when region 1381 is not pressurized, and when pressurized, gas pressure in region 1381 may press the lips against an outer surface of rotary element 1352. To illustrate, when region 1381 is not pressurized, the lips of seal elements 1361 and 1362 need not be in contact with rotary element 1352 and thus do not impart friction forces (e.g., or otherwise impart relatively lesser friction forces if the normal forces is not as great). In some embodiments, seal 1360 is arranged radially between stationary element 1351 and rotary element 1352, and is configured to seal a volume of air in region 1381 between stationary element 1351 and rotary element 1352.

FIG. 14 shows a cross-section view of a portion of another illustrative hub 1400 having a seal, in accordance with some embodiments of the present disclosure. As illustrated, hub 1400 includes stationary element 1451 coupled to rotary element 1452 with bearings 1471 and 1472. Bearings 1471 and 1472 may be but need not be sealed bearings. Stationary element 1451 is affixed to the vehicle frame or other stationary structural component, while rotary element 1452 is coupled to the wheel (e.g., and to a driveshaft if the wheel is a driven wheel). Seal 1460 is arranged radially between stationary element 1451 and rotary element 1452. Ports 1480 are arranged in stationary element 1451 and includes two recesses extending through seals 1460 and 1490, as illustrated (e.g., through holes, which may be coupled or independent for providing more than one controllable air source). For example, ports 1480 may be coupled to one or more pneumatic systems (e.g., system 300, 400, 500, 600, or 700 of FIGS. 3-7), and are configured to provide gas to regions 1481 and 1482. Seals 1460 and 1490 seal respective regions 1481 and 1482, and each include two lips configured to seal against an outer surface of rotary element 1452. To illustrate, when either of regions 1481 and 1482 are not pressurized, the corresponding lips 1461 and 1491 of seal elements 1460 and 1490 need not be in contact with rotary element 1452 and thus do not impart friction forces (e.g., or otherwise impart relatively lesser friction forces if the normal forces is not as great). In some embodiments, seal 1460 is arranged radially between stationary element 1451 and rotary element 1452, and is configured to seal a first volume of air in region 1481 and a second volume of air in region 1482 between stationary element 1451 and rotary element 1452.

Figures 15, 16:
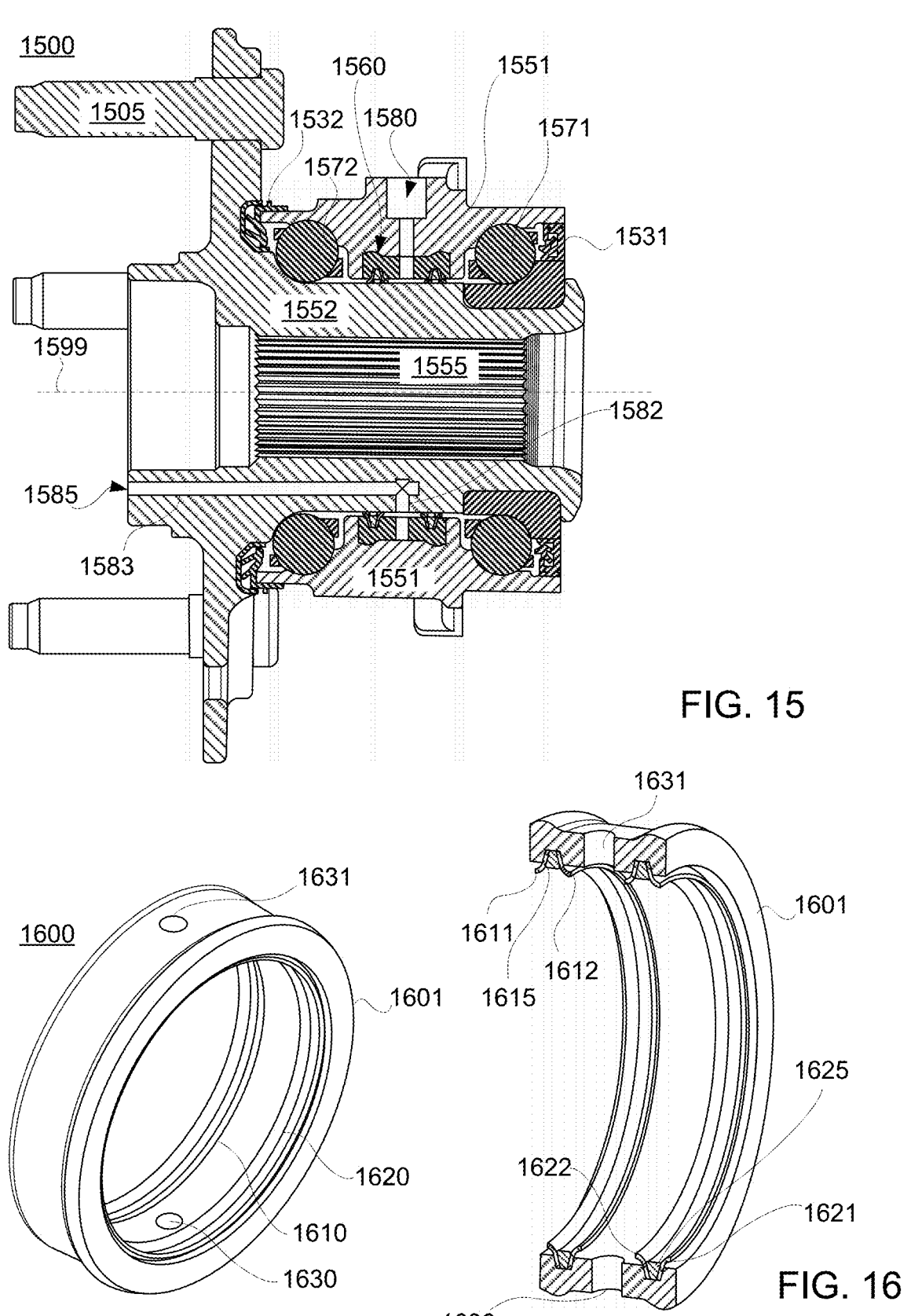
FIG. 15 shows a side cross-section view of an illustrative hub, illustrating an outlet port, in accordance with some embodiments of the present disclosure.
FIG. 16 shows a cross-section view and perspective view of an illustrative seal, in accordance with some embodiments of the present disclosure.

FIG. 15 shows a side cross-section view of illustrative hub 1500, illustrating outlet port 1585, in accordance with some embodiments of the present disclosure. For example, hub 1500 may correspond to any or all of hub assembly 241 of FIG. 2, hubs 351-354 illustrated in FIGS. 3-7, or hub 1200 of FIG. 12. As illustrated, hub 1500 includes studs 1505 configured to mount a wheel, and stationary element 1551 coupled to rotary element 1552 with bearings 1571 and 1572 (e.g., illustrated as ball bearings, although bearings 1571 and

1572 may be any suitable bearing type). As illustrated, seals 1531 and 1532 are configured to seal respective bearings 1571 and 1572 from the environment (e.g., to exclude debris), and may also help protect seal 1560 from the environment. Stationary element 1551 may be affixed to the vehicle frame or other stationary structural component. Rotary element 1552 couples the wheel to a driveshaft, for example, using interface 1555 (e.g., a splined interface as illustrated). Seal 1560 is arranged radially between stationary element 1551 and rotary element 1552. Port 1580 is arranged in stationary element 1551 and includes a through recess extending to and through seal 1560, as illustrated (e.g., a through hole). Seal 1560 includes a collar with a port to allow gas flow into an annular gas volume at an outer surface of rotary element 1552. For example, port 1580 may be coupled to a pneumatic system (e.g., system 300, 400, 500, 600, or 700 of FIGS. 3-7), and be fluid-wise coupled to a port of seal 1560 to provide gas to the annular volume. Seal 1560 includes two seal elements, each including two lips configured to seal against rotary element 1552. In some embodiments, the lips of seal 1560 need not seal when not pressurized, and when pressurized, gas pressure may press the lips against an outer surface of rotary element 1552. In some embodiments, seal 1560 is arranged along drive axis 1599 and radially between stationary element 1551 and rotary element 1552, and is configured to seal a volume of air in an annual region between stationary element 1551 and rotary element 1552. Pressurized gas in the annular region may flow through port 1582 to outlet port 1585 (e.g., ports 1582 and 1585 are along the same flow path and may be combined), which interfaces to a mating port of the wheel to provide the pressurized gas to the tire of the wheel. For example, as the wheel is mounted to a wheel hub (e.g., to hub 1500, using studs 1505 or any other suitable fastener), a port of the wheel may interface and seal to outlet port 1585 (e.g., which may include a taper seal, gasket, O-ring, or any other suitable seal type). To illustrate, a flow path extends from port 1580 through a stationary component (e.g., stationary element 1551) to seal 1560, and from seal 1560 to port 1582 in a rotary component (e.g., rotary element 1552), and from port 1582 to conduit 1583 fluidly coupled to the tire (e.g., via port 1585). It will be understood that when hub 1500 is implemented, for example, in system 700, a flow path will extend from source 701 to a valve (e.g., one of valves 321-324), the valve to seal 1560, seal 1560 to port 1585, and port 1585 to a mounted wheel.

FIG. 16 shows a cross-section view and perspective view of illustrative seal 1600, in accordance with some embodiments of the present disclosure. Seal 1600 includes body 1601 (e.g., a collar), sealing elements 1610 and 1620, and ports 1630 and 1631. Sealing element 1610 includes lips 1611 and 1612 installed with guide 1615, while sealing element 1620 includes lips 1621 and 1622. To illustrate, lips 1612 and 1622 may seal a gas volume (e.g., for inflating a tire), and lips 1611 and 1621 may help prevent debris, dust, grease (e.g., from bearings), oil, water, or other materials from the environment or rest of the vehicle from entering the gas volume (e.g., to prevent contamination of the pressurized gas or damage of the sealing interface). Any or all of the illustrative seals may but need not have a similar construction as seal 1600, although the number of sealing elements, number of lips, and any other suitable aspects may be modified in accordance with the present disclosure. In some embodiments, body 1601 is constructed from metal (e.g., aluminum), plastic, or a combination thereof. In some embodiments, guides 1615 and 1625 are constructed from metal (e.g., aluminum), rubber, plastic, or a combination thereof. In some embodiments, lips 1611, 1612, 1621, and 1622 may include Teflon (PTFE), rubber, plastic, any other suitable material for creating a seal, or any combination thereof.

Figure 17:
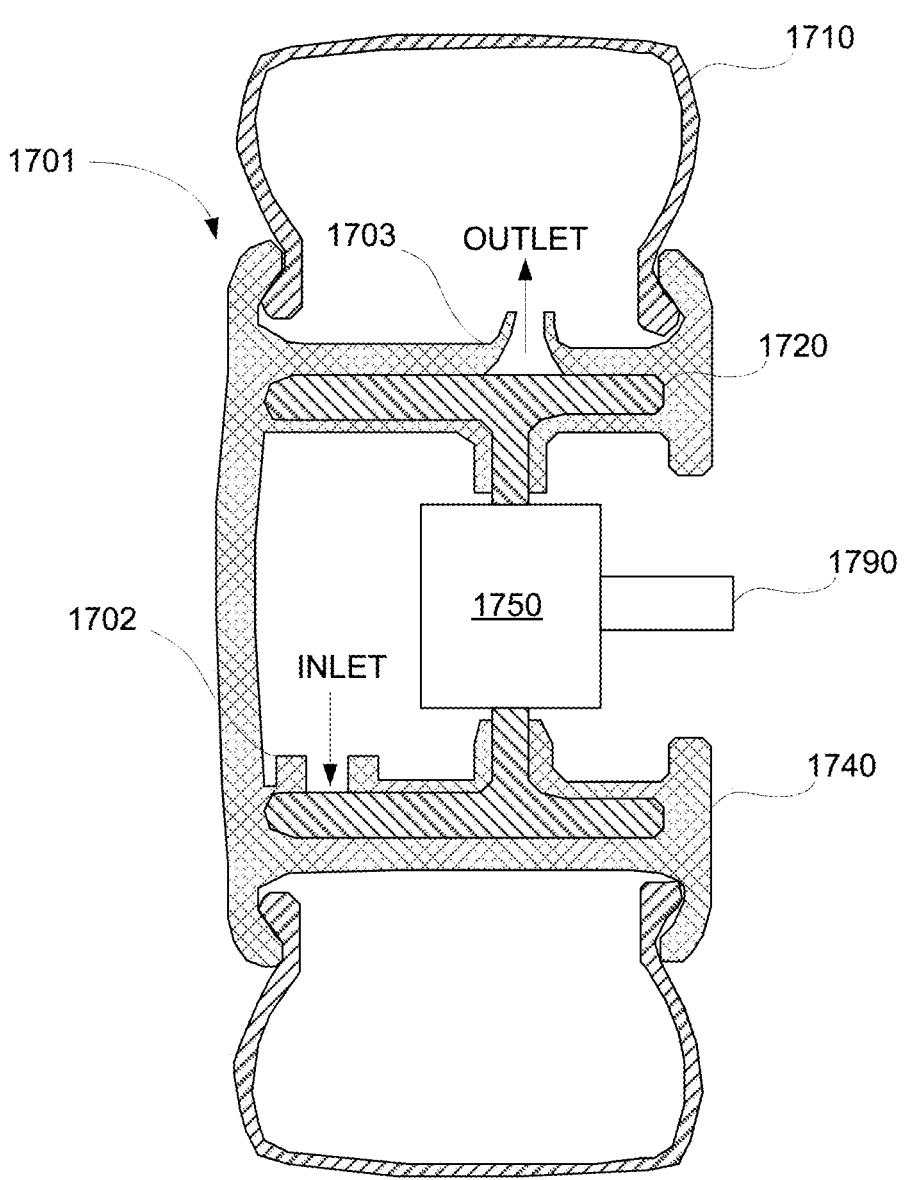
FIG. 17 shows a cross-section view of an illustrative wheel with an integrated air inflation system, in accordance with some embodiments of the present disclosure.

FIG. 17 shows a cross-section view of an illustrative wheel with an integrated air inflation system, in accordance with some embodiments of the present disclosure. As illustrated in FIG. 17, wheel 1701 includes rim 1740, tire 1710 (e.g., mounted and sealed to rim 1740), ports 1702 and 1703, and paddle 1720 (e.g., sealed to rim 1740). Wheel 1701 is illustrated as mounted to hub 1750, of which a rotational element is driven by driveshaft 1790. In some embodiments, as driveshaft 1790 causes wheel 1701 to rotate, air is inducted into port 1702 (e.g., an inlet port) from the atmosphere, and is compressed by rotational motion of paddle 1720 (e.g., which rotates with rim 1740). The compressed air is directed to port 1703 (e.g., an outlet port) to the inside of tire 1710, thus inflating tire 1710. In some embodiments, one or more check valves may be included to prevent a back flow of air into port 1703 and out of port 1702 to atmosphere. For example, either or both of ports 1702 and 1703 may include a check valve, reed valve, or any other suitable component for allowing one-way flow. To illustrate, in some embodiments, wheel 1701 need not require an air supply or hub having a pneumatic seal to provide inflation to tire 1710.

Figure 18:
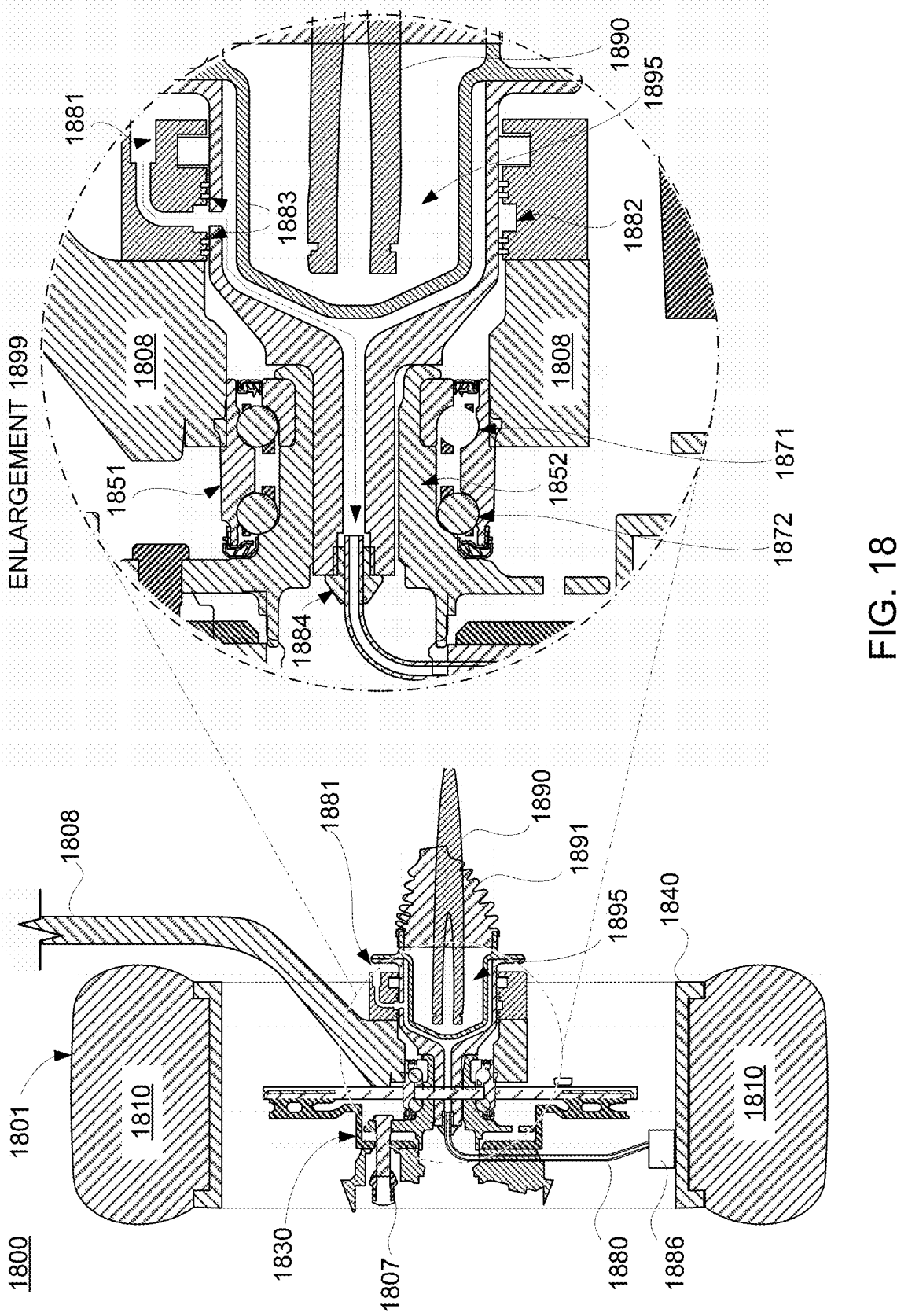
FIG. 18 shows a cross-section view of an illustrative system having a constant-velocity joint with porting for tire inflation, in accordance with some embodiments of the present disclosure.

FIG. 18 shows a cross-section view of illustrative system 1800 having a constant-velocity joint with porting for tire inflation, in accordance with some embodiments of the present disclosure. Enlargement 1899 is included for purposes of clarity. As illustrated, wheel 1801 includes rim 1840 and tire 1810. Wheel 1801 is mounted to hub 1830 (e.g., using lugs 1807), and conduit 1880 couples the volume of tire 1810 (e.g., the pressurized interior of tire 1810) to hub 1830 (e.g., gas passages thereof). Drive shaft 1890 is coupled to a constant-velocity (CV) joint 1895 (e.g., with boot 1891 to keep out debris and house grease), which drives hub 1830. Hub 1830 includes stationary element 1851, which is coupled to rotary element 1852 by bearings 1871 and 1872. Stationary element 1851 is coupled to and stationary with respect to structural component 1808 (e.g., a suspension component) and the structure forming port 1881, and collectively these structures can be referred to as a stationary element. Rotary element 1852 is shown as being coupled to other structures that rotate together with rotary element 1852, and collectively these structures can be referred to as a rotary element. Seal elements 1883 form a seal between stationary element 1851 and rotary element 1852, where the seal is configured to seal a volume of air between the stationary and rotary elements. When wheel 1801 is installed, a flow path exists from port 1881 to interface 1882. For example, an annular gas passage or other suitable recess that may be sealed from the environment, and the flow path extends along the dotted arrow to port 1884. Conduit 1880 couples port 1884 to tire 1810. To illustrate, in some embodiments, port 1884 includes a seal such as mating taper surfaces, an O-ring, a gasket, or any other suitable interface. In some embodiments, conduit 1884 is affixed to port 1884 and is coupled to tire 1810 by a suitable fitting 1886 (e.g., a quick-disconnect type fitting with shutoff valves built in). As wheel 1801 rotates (e.g., under action of CV joint 1895 and driveshaft 1890), conduit 1880 rotates as well, with interface 1882 acting as the stationary-rotary interface for the gas passage. In an illustrative example, hub 1830 need not include a seal such as seal 1260 of hub 1200 of FIG. 12, but rather include a stationary-rotary interface of the air supply that is integrated into components of CV joint 1895 (e.g., not arranged between bearings 1871 and 1872 at hub 1830). It will be understood that when system 1800 is implemented, for example, in system 700, a flow path will extend from source 701 to a valve (e.g., one of valves 321-324), the valve to the seal comprising seal elements 1883, the seal to port 1884, and port 1884 to wheel 1801.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
   a valve coupled to a source of compressed air; and
   a wheel hub comprising:
      a stationary element associated with a wheel of a vehicle;
      a rotary element configured to rotate with the wheel;
      a seal arranged radially between the stationary element and the rotary element, wherein the seal comprises:
         a first set of lips to seal a region configured to receive the compressed air; and
         a second set of lips surrounding the first set of lips; and
      a port arranged in the rotary element, wherein a flow path extends from the source to the valve, the valve to the seal, the seal to the port, and the port to the wheel.

2. The system of claim 1, wherein;
   the stationary element is coupled to the rotary element by a first bearing and a second bearing; and
   the seal is arranged axially between the first bearing and the second bearing, the system further comprising:
      a pair of bearing seals arranged to seal the first bearing, the second bearing, and the seal from an environment surrounding the vehicle.

3. The system of claim 1, wherein the port is a first port configured to receive the compressed air, the system further comprising a second port configured to direct the compressed air to the wheel when mounted to the wheel hub.

4. The system of claim 1, wherein:
   the valve is coupled to a plenum;
   the source of compressed air is an air compressor coupled to the plenum; and
   the valve is controllable to be open or closed.

5. The system of claim 1, further comprising a pressure sensor configured to sense a pressure of at least one of the compressed air or a tire of the wheel coupled to the wheel hub.

6. The system of claim 1, wherein the valve comprises a controllable valve arranged in series with a second valve and with the wheel coupled to the wheel hub.

7. The system of claim 6, wherein the controllable valve is a first controllable valve, wherein the second valve comprises a second controllable valve arranged in series with the first controllable valve and with the wheel, and wherein the second controllable valve is mounted to the wheel hub.

8. An apparatus comprising:
   a stationary element associated with a wheel, wherein the wheel comprises a tire;

a rotary element configured to rotate with the wheel relative to the stationary element;

a seal arranged radially between the stationary element and the rotary element, wherein the seal comprises:

a first set of lips configured to seal a volume between the stationary element and the rotary element; and a second set of lips surrounding the first set of lips; and a port configured to direct air from the volume to the tire.

9. The apparatus of claim 8, wherein:

the stationary element is coupled to the rotary element by a first bearing and a second bearing;

the seal is arranged between the stationary element and the rotary element along a drive axis; and the seal is arranged axially between the first bearing and the second bearing, the apparatus further comprising:

a pair of bearing seals arranged to seal the first bearing, the second bearing, and the seal from an environment surrounding the wheel.

10. The apparatus of claim 8, wherein:

the port is a first port configured to rotate with the wheel;

the stationary element comprises a second port coupled to an air source; and a flow path extends from the second port through the stationary element to the volume, and from the volume to the first port, and from the first port to a conduit fluidly coupled to the tire.

11. A method comprising:

measuring, using control circuitry, a pressure of a tire based on a sensor signal, wherein the tire is mounted to a wheel coupled to a wheel hub of a vehicle;

determining, using the control circuitry, whether to inflate or deflate the tire based on the pressure;

generating, using the control circuitry, a control signal to control a valve coupled to the tire to achieve an open position to form a flow path through a seal of the wheel hub, wherein the seal comprises:

a first set of lips to seal a region configured to receive compressed air; and a second set of lips surrounding the first set of lips; and monitoring the pressure of the tire while the valve is in the open position.

12. The method of claim 11, further comprising receiving an indication from an interface, wherein the indication comprises at least one of a tire pressure, a driving condition, or a user preference, and wherein determining whether to inflate or deflate the tire is further based on the indication.

13. The method of claim 11, further comprising receiving an indication from an interface, wherein the indication comprises at least one of a target pressure or a target pressure range.

14. The method of claim 11, further comprising:

generating a first control signal that causes an air compressor to begin compressing air; and generating a second control signal that causes the air compressor to cease compressing air when the pressure is greater than a threshold.

15. The method of claim 11, wherein:

the valve is one of a plurality of valves coupled to an air source, wherein each valve of the plurality of valves is coupled to a respective wheel; and generating the control signal comprises generating a plurality of control signals corresponding to the plurality of valves.

16. The method of claim 11, wherein measuring the pressure of the tire comprises:

opening the valve to communicate the pressure to a sensor, wherein the sensor is located remote from the wheel; and closing the valve to seal the tire after the sensor signal is received by the control circuitry.

17. The method of claim 11, wherein:

the valve is a first valve affixed to a plenum;

the control signal is further configured to open a second valve affixed to the wheel hub; and the second valve is arranged in series with the first valve.

18. The system of claim 1, wherein:

the rotary element comprises a splined interface configured to receive a splined driveshaft, and the port is arranged radially outward of the splined interface.

19. The system of claim 1, wherein the seal comprises:

a collar;

an air port arranged in the collar and configured to receive the compressed air; and a set of guides arranged along the first set of lips and the second set of lips.

20. The apparatus of claim 8, wherein:

the rotary element comprises a splined interface configured to receive a splined driveshaft, and the port is arranged radially outward of the splined interface.

\* \* \* \* \*